(12) United States Patent
Fukushima

(10) Patent No.: US 6,298,768 B1
(45) Date of Patent: Oct. 9, 2001

(54) BEVERAGE SERVING APPARATUS

(75) Inventor: Naoto Fukushima, Gunma-Ken (JP)

(73) Assignee: Sanyo Electric Co., Ltd., Osaka-Fu (JP)

( * ) Notice: Subject to any disclaimer, the term of this patent is extended or adjusted under 35 U.S.C. 154(b) by 0 days.

(21) Appl. No.: 09/584,086

(22) Filed: May 31, 2000

Related U.S. Application Data

(62) Division of application No. 09/221,133, filed on Dec. 28, 1998, now Pat. No. 6,085,637.

(51) Int. Cl.[7] .................................................... A47J 31/00
(52) U.S. Cl. ................................ 99/279; 99/287; 99/293; 99/289 T
(58) Field of Search .................... 99/279, 287, 289 R, 99/289 T, 293, 302 R, 302 P

(56) References Cited

U.S. PATENT DOCUMENTS 4,885,121  12/1989  Grossi ................................ 99/289 R

FOREIGN PATENT DOCUMENTS

| | | |
|---|---|---|
| 2 111 996 | 9/1972 | (DE) . |
| 0 477 669 | 4/1992 | (EP) . |
| 3-163695 | 7/1991 | (JP) . |
| 5-197878 | 8/1993 | (JP) . |
| 9-50578 | 2/1997 | (JP) . |
| 9-265574 | 10/1997 | (JP) . |
| 10-162239 | 6/1998 | (JP) . |

Primary Examiner—Reginald L. Alexander
(74) Attorney, Agent, or Firm—McDermott, Will & Emery

(57) ABSTRACT

An apparatus for serving a hot beverage prepared by extraction capable of serving the beverage kept at high temperature is provided. A plate for radiating far-infrared rays is provided facing the extraction chamber with a predetermined distance separating each other. The plate heated by a heater radiates far-infrared rays, whereby the extraction chamber is heated by the far-infrared rays, thereby serving of a hot extracted beverage is facilitated. In another embodiment, fans for exhaling steam are provided separately for a receiver for receiving the raw material and hot water and for a mixing bowl for mixing additives such as sugar, milk, etc., thereby serving of a hot extracted beverage is facilitated. In still further embodiment, the extraction chamber for mixing the raw material with hot water and extracting a beverage from the mixture is contained in a case the inside of which is heated by a heater, and a steam exhaling tube is provided which has an inlet communicated with the receiving chamber and an outlet at a predetermined position inside the case, thereby serving of a hot extracted beverage is facilitated.

4 Claims, 17 Drawing Sheets

FIG.1 PRIOR ART

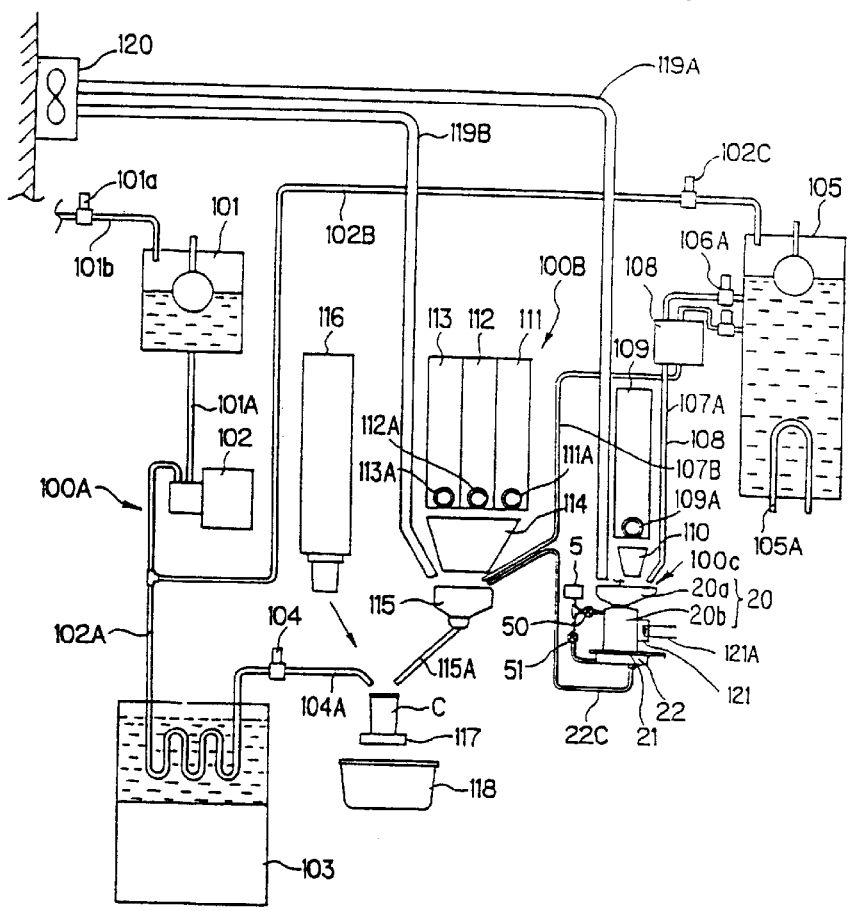

5 AIR PUMP
20 CYLINDER
20a RECEIVING CHAMBER
20b EXTRACTION CHAMBER
21 FILTER
22 BEVERAGE RECEIVER
22c BEVERAGE SUPPLY TUBE
50 UPPER AIR VALVE
51 LOWER AIR VALVE
100A WATER SUPPLY UNIT
100B BEVERAGE PREPARATION UNIT
100C BEVERAGE EXTRACTION UNIT
101 RESERVOIR
101a WATER SUPPLY VALVE
101b WATER SUPPLY TUBE
102 WATER SUPPLY PUMP
102A WATER SUPPLY TUBE
102B WATER SUPPLY TUBE
102C WATER SUPPLY VALVE
103 COLD WATER TANK
104 COLD WATER SUPPLY VALVE
104A COLD WATER SUPPLYING NOZZLE
105 HOT WATER TANK
105A HEATER

106A HOT WATER SUPPLY VALVE
106B HOT WATER SUPPLY VALVE
107A HOT WATER SUPPLY TUBE
107B HOT WATER SUPPLY TUBE
108 RE-HEATING HEATER BLOCK
109 REGULAR COFFEE CANISTER
109A OUTLET
110 RAW MATERIAL CHUTE
111 SUGAR CANISTER
111A OUTLET
112 INSTANT COFFEE CANISTER
112A OUTLET
113 MILK CANISTER
113A OUTLET
114 RAW MATERIAL CHUTE
115 MIXING BOWL
115A NOZZLE
116 CUP SUPPLY APPARATUS
117 CUP RECEIVER
118 WASTE BUCKET
119A STEAM EXHAUST TUBE
119B STEAM EXHAUST TUBE
120 BLOWER FAN
121 HEATER BLOCK
121A HEATER

FIG.2

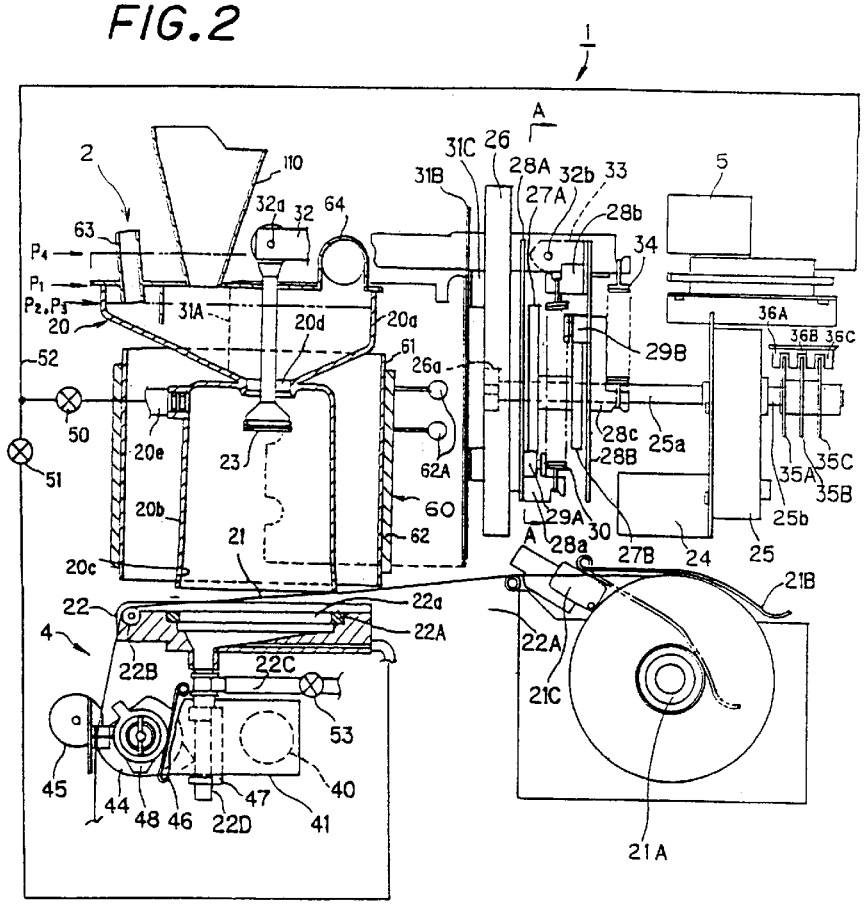

- 1 BEVERAGE SERVING APPARATUS
- 2 EXTRACTION UNIT
- 3 AIR PUMP
- 4 WASTE PROCESSING UNIT
- 5 AIR PUMP
- 20 CYLINDER
- 20a RECEIVING CHAMBER
- 20b EXTRACTION CHAMBER
- 20c OUTLET
- 20d CONDUIT
- 20e INLET
- 21 PAPER FILTER
- 21A AXIS
- 21B FILTER AMOUNT DETECTING LEVER
- 21C FILTER SHORTAGE DETECTING LEVER
- 22 BEVERAGE RECEIVER
- 22a OPENING
- 22c BEVERAGE SUPPLY TUBE
- 22A RUBBER SEAL
- 22B ROLLER
- 22C BEVERAGE SUPPLY TUBE
- 22D DRAIN TUBE
- 23 VALVE
- 24 EXTRACTION MOTOR
- 25 REDUCTION UNIT
- 25a OUTPUT AXIS
- 25b OUTPUT AXIS
- 26 SUPPORTING PLATE
- 26a BEARING
- 27A CYLINDER CAM
- 27B VALVE CAM
- 28A CYLINDER DRIVING PLATE
- 28B VALVE DRIVING PLATE
- 29A CYLINDER CAM FOLLOWER
- 29B VALVE CAM FOLLOWER
- 30 DRAWING COIL SPRING
- 31A, 31B, 31C CONNECTING MEMBER
- 32 LEVER
- 32a PIN
- 32b PIN
- 33 CONNECTING MEMBER
- 34 DRAWING COIL SPRING
- 35A FIRST PROCESS REGULATION PLATE
- 35B SECOND PROCESS REGULATION PLATE
- 35C THIRD PROCESS REGULATION PLATE
- 36A FIRST PROCESS REGULATION SENSOR
- 36B SECOND PROCESS REGULATION SENSOR
- 36C THIRD PROCESS REGULATION SENSOR
- 40 WASTE PROCESSING MOTOR
- 41 REDUCING UNIT
- 44 FILTER SUPPLY ROLLER
- 45 GUIDE ROLLER
- 46 PRESSURE PLATE
- 47 STATIONARY PLATE
- 48 PRESSING CAM
- 50 UPPER AIR VALVE
- 51 LOWER AIR VALVE
- 52 AIR PIPE
- 53 BEVERAGE SUPPLY VALVE
- 60 HEATING SYSTEM
- 61 CYLINDRICAL METAL PLATE
- 62 HEATER
- 62A TERMINAL
- 63 HOT WATER INLET
- 64 STEAM OUTLET
- 110 RAW MATERIAL CHUTE

25a OUTPUT AXIS
25c KEY
27A CYLINDER CAM
27B VALVE CAM
29A CYLINDER CAM FOLLOWER
29B VALVE CAM FOLLOWER

24 EXTRACTION MOTOR
25 REDUCTION UNIT
25a OUTPUT AXIS
25b OUTPUT AXIS
35a PROTRUSION
35b PROTRUSION
35c PROTRUSION

35A FIRST PROCESS REGULATION PLATE
35B SECOND PROCESS REGULATION PLATE
35C THIRD PROCESS REGULATION PLATE
36A FIRST PROCESS REGULATION SENSOR
36B SECOND PROCESS REGULATION SENSOR
36C THIRD PROCESS REGULATION SENSOR

40 WASTE PROCESSING MOTOR
41 REDUCING UNIT
41a OUTPUT AXIS
42A DRAIN TUBE OPENING DETECTION PLATE
42B DRAIN TUBE CLOSING DETECTION PLATE
42a PROTRUSION
43A DRAIN TUBE OPENING DETECTION SENSOR
43B DRAIN TUBE CLOSING DETECTION SENSOR
44 FILTER SUPPLY ROLLER
44a INDENTATION
45 GUIDE ROLLER
46 PRESSURE PLATE
46a SUPPORTING AXIS
48 PRESSING CAM
48a PROTRUSION

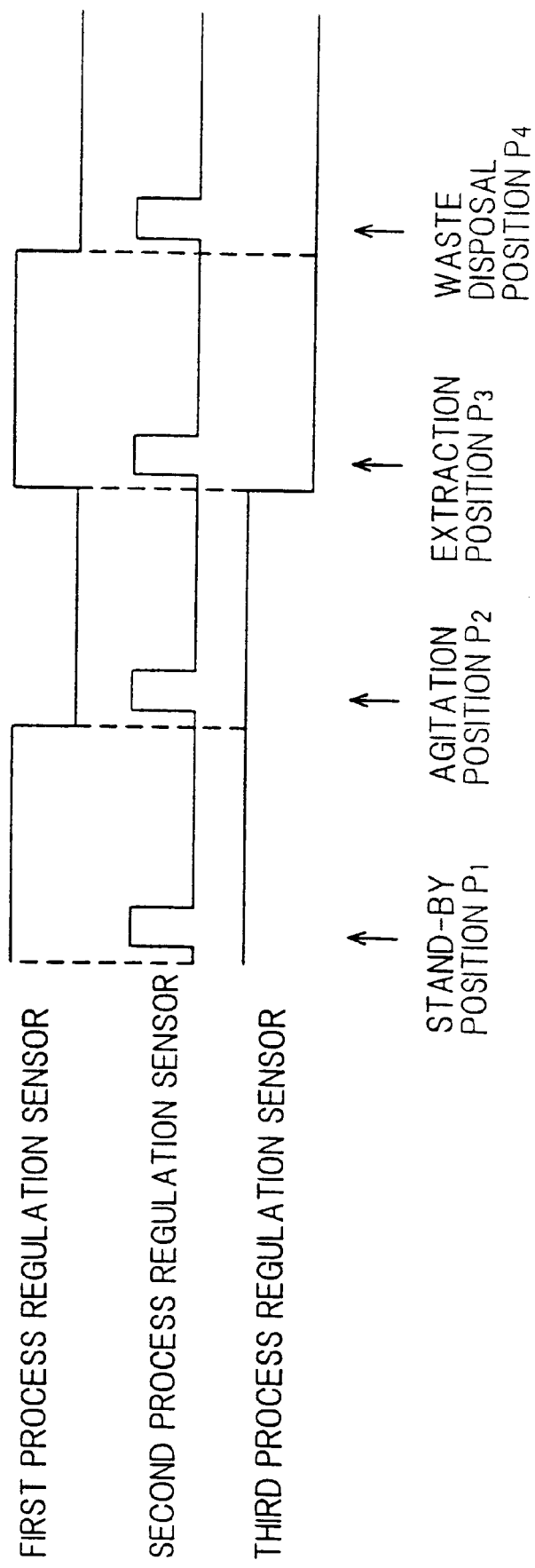

FIG.8A

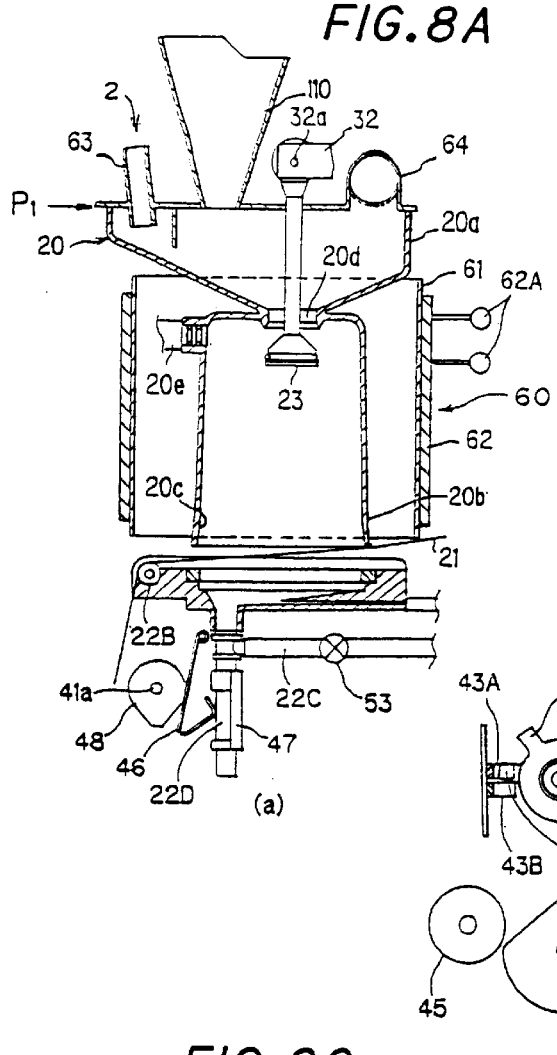

- 20 CYLINDER
- 20a RECEIVING CHAMBER
- 20b EXTRACTION CHAMBER
- 20c OUTLET
- 20d CONDUIT
- 20e INLET
- 21 PAPER FILTER
- 22B ROLLER
- 22C BEVERAGE SUPPLY TUBE
- 22D DRAIN TUBE
- 23 VALVE
- 41a OUTPUT AXIS
- 46 PRESSURE PLATE
- 47 STATIONARY PLATE
- 48 PRESSING CAM
- 52 AIR PIPE
- 53 BEVERAGE SUPPLY VALVE
- 60 HEATING SYSTEM
- 61 CYLINDRICAL METAL PLATE
- 62 HEATER
- 62A TERMINAL
- 63 HOT WATER INLET
- 64 STEAM OUTLET
- 110 RAW MATERIAL CHUTE

FIG.8B

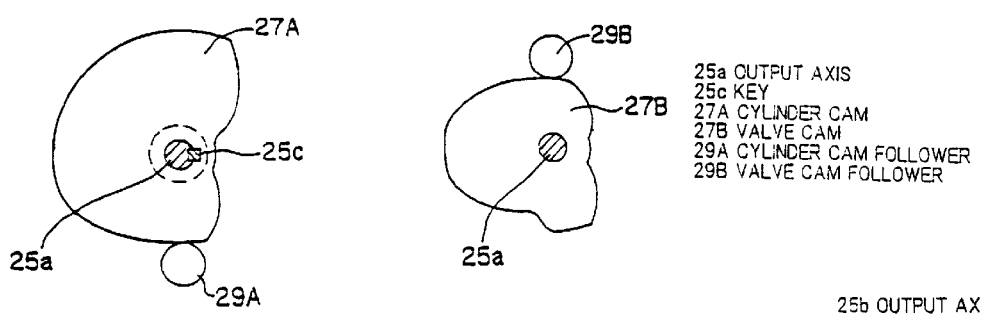

- 42A DRAIN TUBE OPENING DETECTION PLATE
- 42B DRAIN TUBE CLOSING DETECTION PLATE
- 43A DRAIN TUBE OPENING DETECTION SENSOR
- 43B DRAIN TUBE CLOSING DETECTION SENSOR
- 44 FILTER SUPPLY ROLLER
- 45 GUIDE ROLLER

FIG.8C

- 25a OUTPUT AXIS
- 25c KEY
- 27A CYLINDER CAM
- 27B VALVE CAM
- 29A CYLINDER CAM FOLLOWER
- 29B VALVE CAM FOLLOWER

FIG.8D

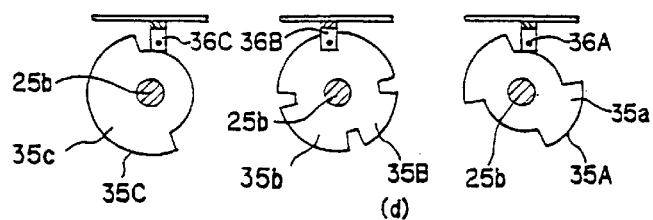

(d)

- 25b OUTPUT AXIS
- 35a PROTRUSION
- 35b PROTRUSION
- 35c PROTRUSION
- 35A FIRST PROCESS REGULATION PLATE
- 35B SECOND PROCESS REGULATION PLATE
- 35C THIRD PROCESS REGULATION PLATE
- 36A FIRST PROCESS REGULATION SENSOR
- 36B SECOND PROCESS REGULATION SENSOR
- 36C THIRD PROCESS REGULATION SENSOR

FIG. 9A

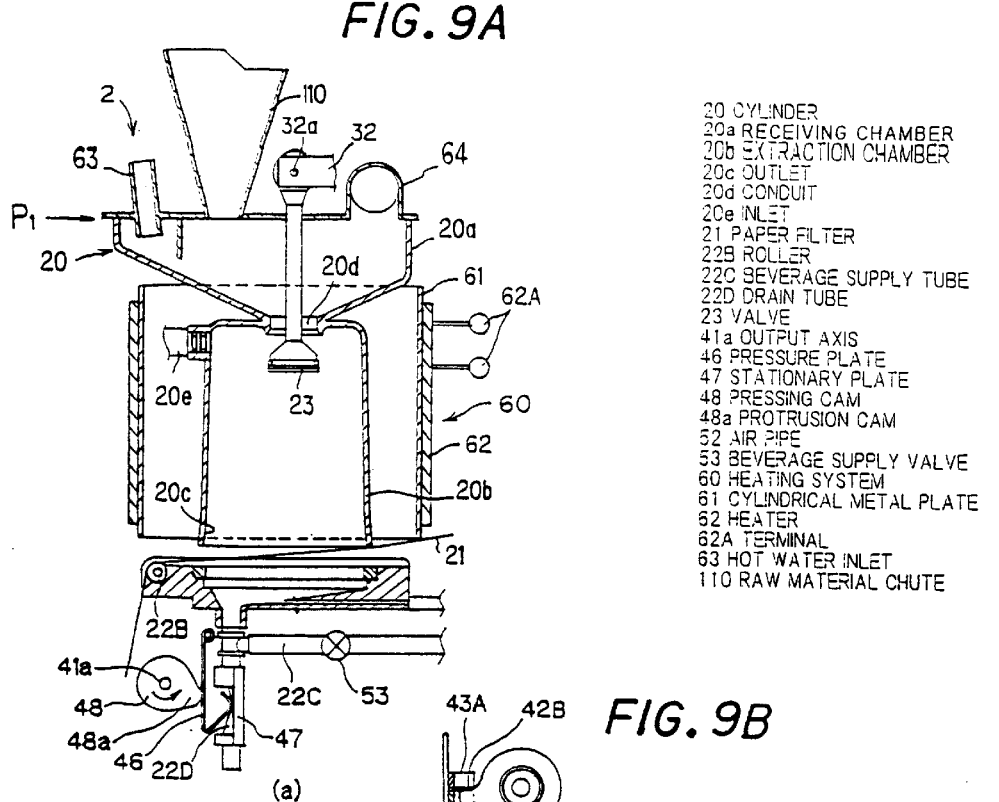

- 20 CYLINDER
- 20a RECEIVING CHAMBER
- 20b EXTRACTION CHAMBER
- 20c OUTLET
- 20d CONDUIT
- 20e INLET
- 21 PAPER FILTER
- 22B ROLLER
- 22C BEVERAGE SUPPLY TUBE
- 22D DRAIN TUBE
- 23 VALVE
- 41a OUTPUT AXIS
- 46 PRESSURE PLATE
- 47 STATIONARY PLATE
- 48 PRESSING CAM
- 48a PROTRUSION CAM
- 52 AIR PIPE
- 53 BEVERAGE SUPPLY VALVE
- 60 HEATING SYSTEM
- 61 CYLINDRICAL METAL PLATE
- 62 HEATER
- 62A TERMINAL
- 63 HOT WATER INLET
- 110 RAW MATERIAL CHUTE

FIG. 9B

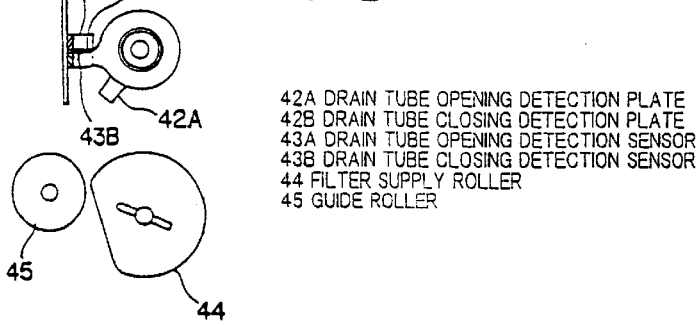

- 42A DRAIN TUBE OPENING DETECTION PLATE
- 42B DRAIN TUBE CLOSING DETECTION PLATE
- 43A DRAIN TUBE OPENING DETECTION SENSOR
- 43B DRAIN TUBE CLOSING DETECTION SENSOR
- 44 FILTER SUPPLY ROLLER
- 45 GUIDE ROLLER

FIG. 9C

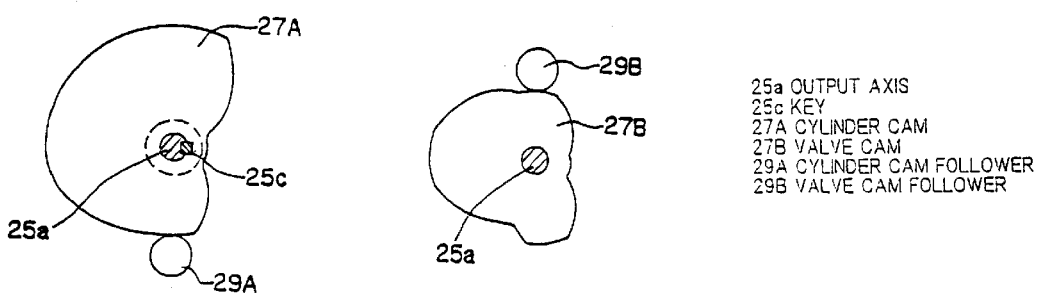

- 25a OUTPUT AXIS
- 25c KEY
- 27A CYLINDER CAM
- 27B VALVE CAM
- 29A CYLINDER CAM FOLLOWER
- 29B VALVE CAM FOLLOWER

FIG. 9D

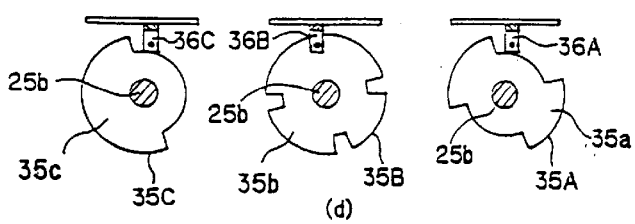

(d)

- 25b OUTPUT AXIS
- 35a PROTRUSION
- 35b PROTRUSION
- 35c PROTRUSION
- 35A FIRST PROCESS REGULATION PLATE
- 35B SECOND PROCESS REGULATION PLATE
- 35C THIRD PROCESS REGULATION PLATE
- 36A FIRST PROCESS REGULATION SENSOR
- 36B SECOND PROCESS REGULATION SENSOR
- 36C THIRD PROCESS REGULATION SENSOR

FIG.10A

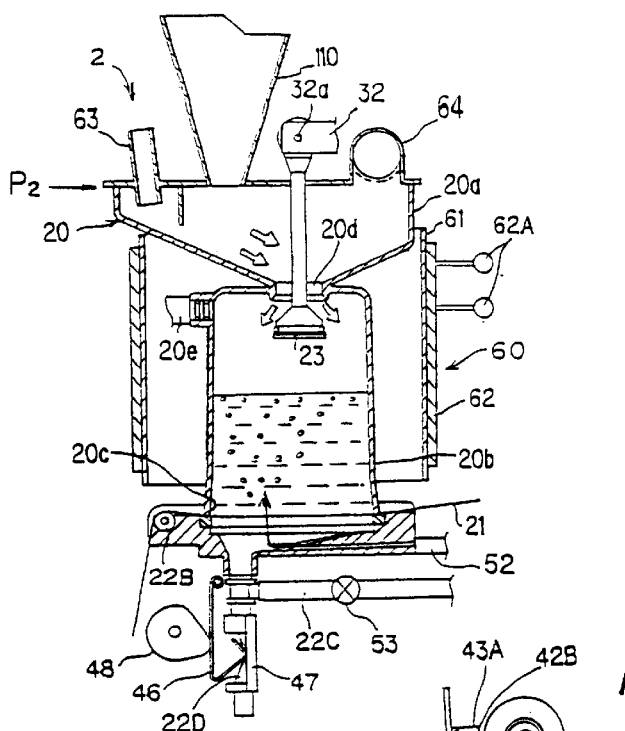

- 20 CYLINDER
- 20a RECEIVING CHAMBER
- 20b EXTRACTION CHAMBER
- 20c OUTLET
- 20d CONDUIT
- 20e INLET
- 21 PAPER FILTER
- 22B ROLLER
- 22C BEVERAGE SUPPLY TUBE
- 22D DRAIN TUBE
- 23 VALVE
- 41a OUTPUT AXIS
- 46 PRESSURE PLATE
- 47 STATIONARY PLATE
- 48 PRESSING CAM
- 48a PROTRUSION CAM
- 52 AIR PIPE
- 53 BEVERAGE SUPPLY VALVE
- 60 HEATING SYSTEM
- 61 CYLINDRICAL METAL PLATE
- 62 HEATER
- 62A TERMINAL
- 63 HOT WATER INLET
- 110 RAW MATERIAL CHUTE

FIG.10B

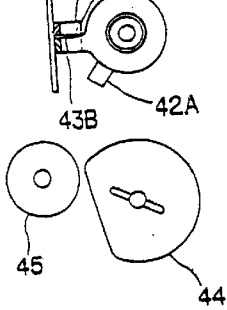

- 42A DRAIN TUBE OPENING DETECTION PLATE
- 42B DRAIN TUBE CLOSING DETECTION PLATE
- 43A DRAIN TUBE OPENING DETECTION SENSOR
- 43B DRAIN TUBE CLOSING DETECTION SENSOR
- 44 FILTER SUPPLY ROLLER
- 45 GUIDE ROLLER

FIG.10C

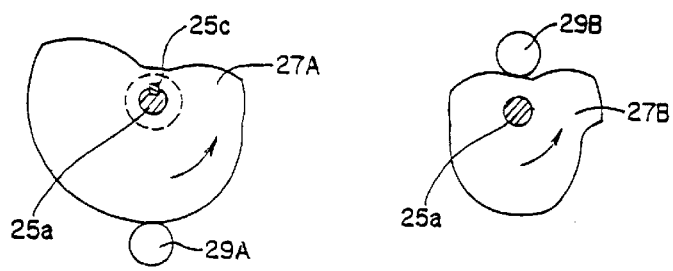

- 25a OUTPUT AXIS
- 25c KEY
- 27A CYLINDER CAM
- 27B VALVE CAM
- 29A CYLINDER CAM FOLLOWER
- 29B VALVE CAM FOLLOWER

FIG.10D

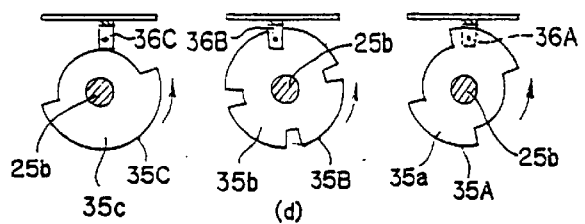

- 25b OUTPUT AXIS
- 35a PROTRUSION
- 35b PROTRUSION
- 35c PROTRUSION
- 35A FIRST PROCESS REGULATION PLATE
- 35B SECOND PROCESS REGULATION PLATE
- 35C THIRD PROCESS REGULATION PLATE
- 36A FIRST PROCESS REGULATION SENSOR
- 36B SECOND PROCESS REGULATION SENSOR
- 36C THIRD PROCESS REGULATION SENSOR

FIG.11A

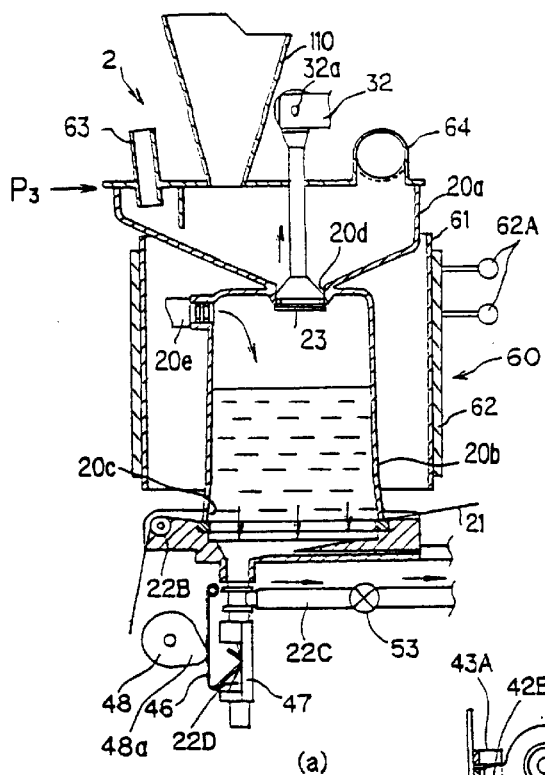

- 20 CYLINDER
- 20a RECEIVING CHAMBER
- 20b EXTRACTION CHAMBER
- 20c OUTLET
- 20d CONDUIT
- 20e INLET
- 21 PAPER FILTER
- 22B ROLLER
- 22C BEVERAGE SUPPLY TUBE
- 22D DRAIN TUBE
- 23 VALVE
- 41a OUTPUT AXIS
- 46 PRESSURE PLATE
- 47 STATIONARY PLATE
- 48 PRESSING CAM
- 48a PROTRUSION CAM
- 52 AIR PIPE
- 53 BEVERAGE SUPPLY VALVE
- 60 HEATING SYSTEM
- 61 CYLINDRICAL METAL PLATE
- 62 HEATER
- 62A TERMINAL
- 63 HOT WATER INLET
- 110 RAW MATERIAL CHUTE

FIG.11B

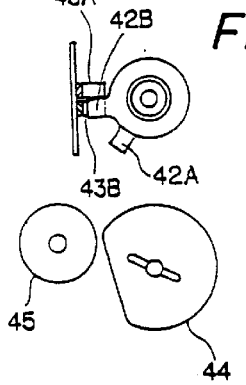

- 42A DRAIN TUBE OPENING DETECTION PLATE
- 42B DRAIN TUBE CLOSING DETECTION PLATE
- 43A DRAIN TUBE OPENING DETECTION SENSOR
- 43B DRAIN TUBE CLOSING DETECTION SENSOR
- 44 FILTER SUPPLY ROLLER
- 45 GUIDE ROLLER

FIG.11C

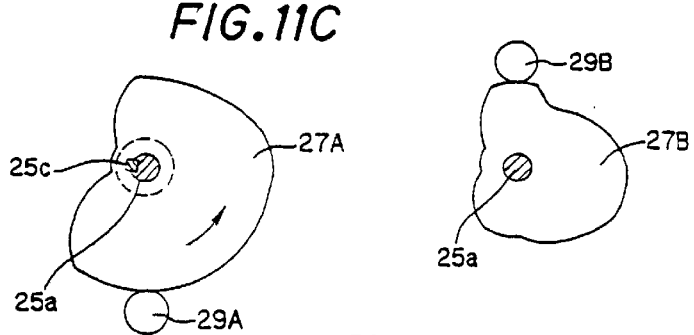

- 25a OUTPUT AXIS
- 25c KEY
- 27A CYLINDER CAM
- 27B VALVE CAM
- 29A CYLINDER CAM FOLLOWER
- 29B VALVE CAM FOLLOWER

FIG.11D

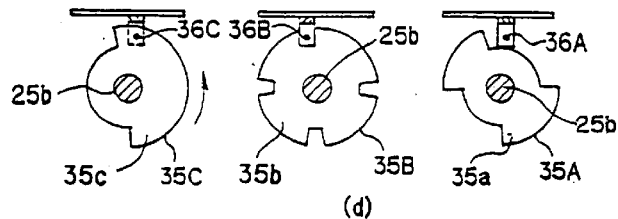

- 25b OUTPUT AXIS
- 35a PROTRUSION
- 35b PROTRUSION
- 35c PROTRUSION
- 35A FIRST PROCESS REGULATION PLATE
- 35B SECOND PROCESS REGULATION PLATE
- 35C THIRD PROCESS REGULATION PLATE
- 36A FIRST PROCESS REGULATION SENSOR
- 36B SECOND PROCESS REGULATION SENSOR
- 36C THIRD PROCESS REGULATION SENSOR

FIG.12A

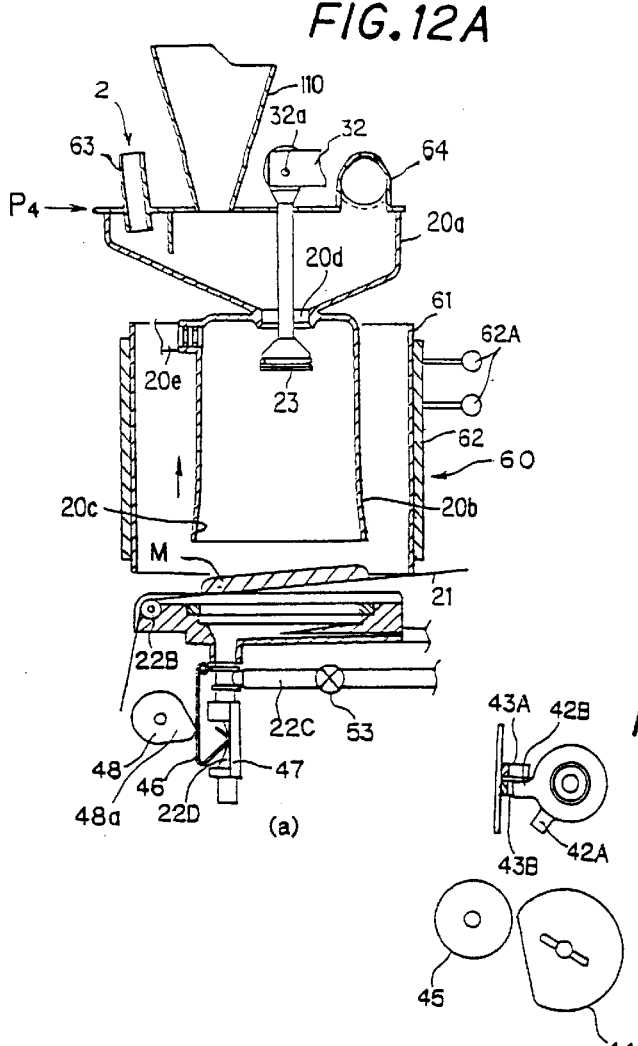

20 CYLINDER
20a RECEIVING CHAMBER
20b EXTRACTION CHAMBER
20c OUTLET
20d CONDUIT
20e INLET
21 PAPER FILTER
22B ROLLER
22C BEVERAGE SUPPLY TUBE
22D DRAIN TUBE
23 VALVE
41a OUTPUT AXIS
46 PRESSURE PLATE
47 STATIONARY PLATE
48 PRESSING CAM
48a PROTRUSION CAM
52 AIR PIPE
53 BEVERAGE SUPPLY VALVE
60 HEATING SYSTEM
61 CYLINDRICAL METAL PLATE
62 HEATER
62A TERMINAL
63 HOT WATER INLET
110 RAW MATERIAL CHUTE

FIG.12B

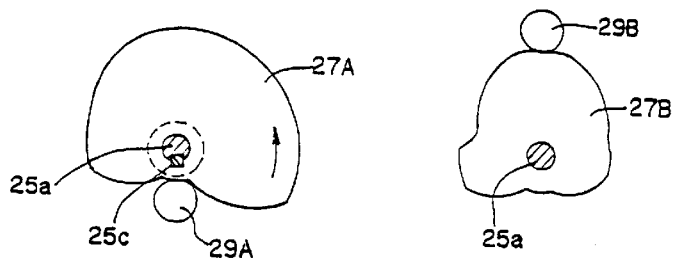

42A DRAIN TUBE OPENING DETECTION PLATE
42B DRAIN TUBE CLOSING DETECTION PLATE
43A DRAIN TUBE OPENING DETECTION SENSOR
43B DRAIN TUBE CLOSING DETECTION SENSOR
44 FILTER SUPPLY ROLLER
45 GUIDE ROLLER

FIG.12C

25a OUTPUT AXIS
25c KEY
27A CYLINDER CAM
27B VALVE CAM
29A CYLINDER CAM FOLLOWER
29B VALVE CAM FOLLOWER

FIG.12D

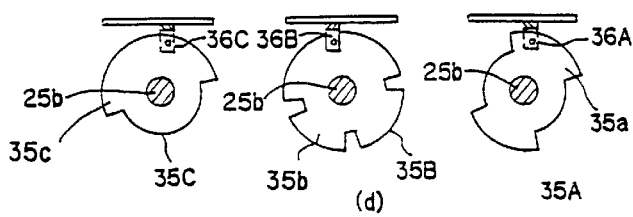

25b OUTPUT AXIS
35a PROTRUSION
35b PROTRUSION
35c PROTRUSION
35A FIRST PROCESS
  REGULATION PLATE
35B SECOND PROCESS
  REGULATION PLATE
35C THIRD PROCESS
  REGULATION PLATE
36A FIRST PROCESS
  REGULATION SENSOR
36B SECOND PROCESS
  REGULATION SENSOR
36C THIRD PROCESS
  REGULATION SENSOR

FIG.13A

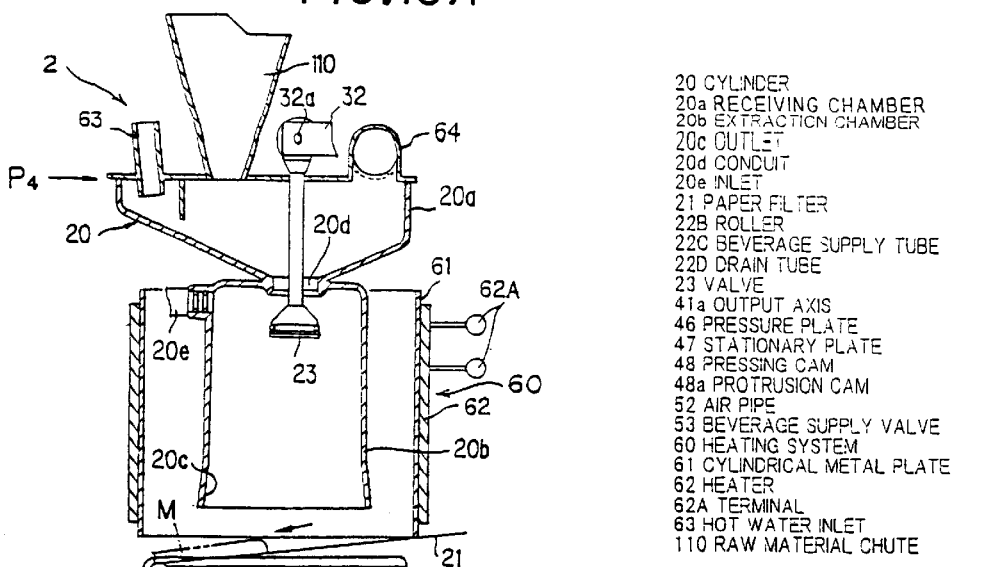

- 20 CYLINDER
- 20a RECEIVING CHAMBER
- 20b EXTRACTION CHAMBER
- 20c OUTLET
- 20d CONDUIT
- 20e INLET
- 21 PAPER FILTER
- 22B ROLLER
- 22C BEVERAGE SUPPLY TUBE
- 22D DRAIN TUBE
- 23 VALVE
- 41a OUTPUT AXIS
- 46 PRESSURE PLATE
- 47 STATIONARY PLATE
- 48 PRESSING CAM
- 48a PROTRUSION CAM
- 52 AIR PIPE
- 53 BEVERAGE SUPPLY VALVE
- 60 HEATING SYSTEM
- 61 CYLINDRICAL METAL PLATE
- 62 HEATER
- 62A TERMINAL
- 63 HOT WATER INLET
- 110 RAW MATERIAL CHUTE

FIG.13B

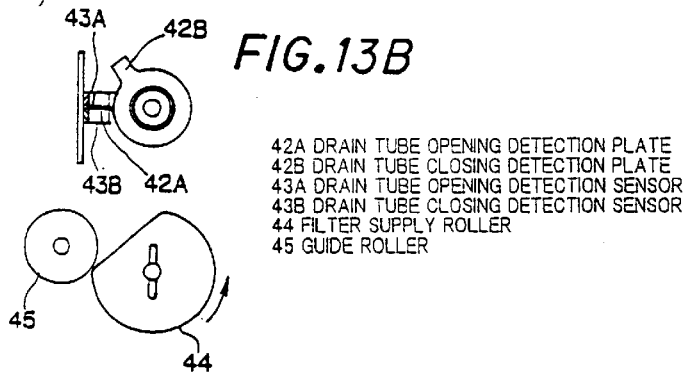

- 42A DRAIN TUBE OPENING DETECTION PLATE
- 42B DRAIN TUBE CLOSING DETECTION PLATE
- 43A DRAIN TUBE OPENING DETECTION SENSOR
- 43B DRAIN TUBE CLOSING DETECTION SENSOR
- 44 FILTER SUPPLY ROLLER
- 45 GUIDE ROLLER

FIG.13C

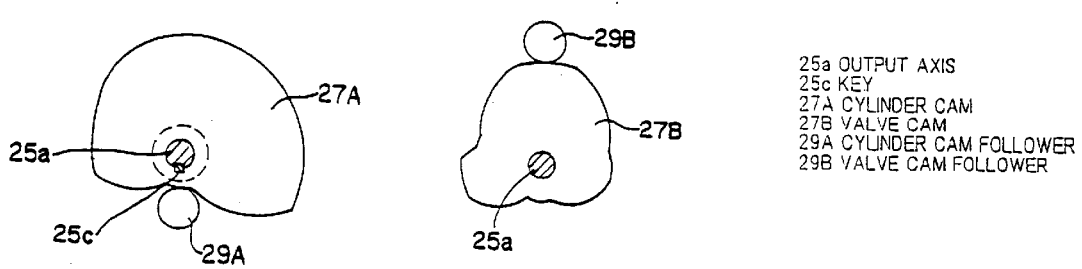

- 25a OUTPUT AXIS
- 25c KEY
- 27A CYLINDER CAM
- 27B VALVE CAM
- 29A CYLINDER CAM FOLLOWER
- 29B VALVE CAM FOLLOWER

FIG.13D

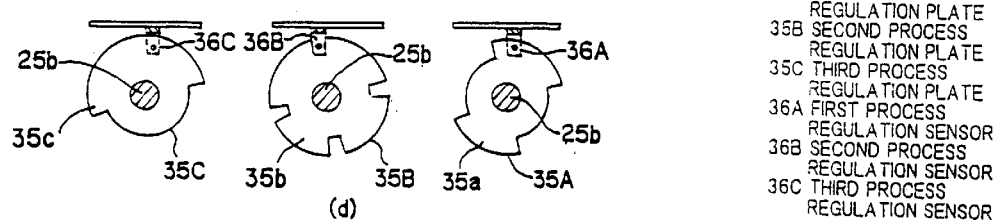

(d)

- 25b OUTPUT AXIS
- 35a PROTRUSION
- 35b PROTRUSION
- 35c PROTRUSION
- 35A FIRST PROCESS REGULATION PLATE
- 35B SECOND PROCESS REGULATION PLATE
- 35C THIRD PROCESS REGULATION PLATE
- 36A FIRST PROCESS REGULATION SENSOR
- 36B SECOND PROCESS REGULATION SENSOR
- 36C THIRD PROCESS REGULATION SENSOR

20 CYLINDER
20a RECEIVING CHAMBER
20b EXTRACTION CHAMBER
20c OUTLET
20d CONDUIT
20e INLET
23 VALVE
32 LEVER
32a PIN
61A METAL PLATE
62A TERMINAL
63 HOT WATER INLET
64 STEAM OUTLET
65 TEMPERATURE SENSOR
66 TERMINAL
110 RAW MATERIAL CHUTE

FIG.16

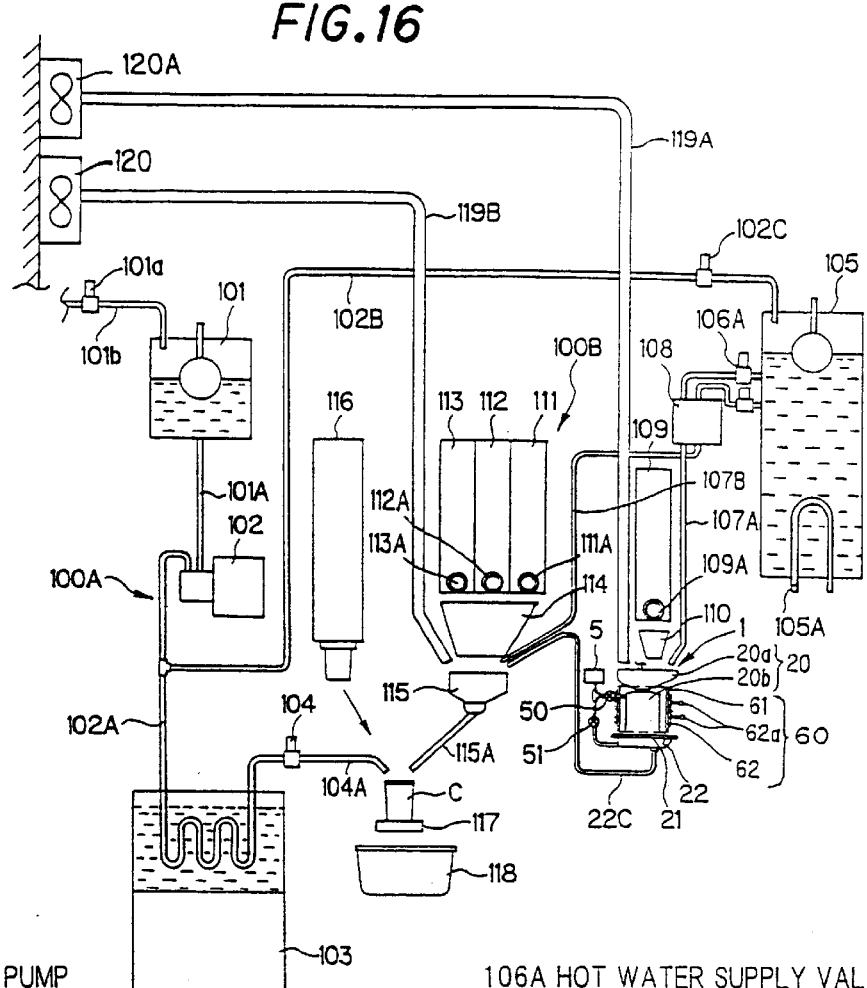

5 AIR PUMP
20 CYLINDER
20a RECEIVING CHAMBER
20b EXTRACTION CHAMBER
21 FILTER
22 BEVERAGE RECEIVER
22c BEVERAGE SUPPLY TUBE
50 UPPER AIR VALVE
51 LOWER AIR VALVE
60 HEATING SYSTEM
61 CYLINDRICAL METAL PLATE
62 HEATER
62a HEATER
100A WATER SUPPLY UNIT
100B BEVERAGE PREPARATION UNIT
100C BEVERAGE EXTRACTION UNIT
101 RESERVOIR
101a WATER SUPPLY VALVE
101b WATER SUPPLY TUBE
102 WATER SUPPLY PUMP
102A WATER SUPPLY TUBE
102B WATER SUPPLY TUBE
102C WATER SUPPLY VALVE
103 COLD WATER TANK
104 COLD WATER SUPPLY VALVE
104A COLD WATER SUPPLYING NOZZLE
105 HOT WATER TANK
105A HEATER

106A HOT WATER SUPPLY VALVE
107A HOT WATER SUPPLY TUBE
107B HOT WATER SUPPLY TUBE
108 RE-HEATING HEATER BLOCK
109 REGULAR COFFEE CANISTER
109A OUTLET
110 RAW MATERIAL CHUTE
111 SUGAR CANISTER
111A OUTLET
112 INSTANT COFFEE CANISTER
112A OUTLET
113 MILK CANISTER
113A OUTLET
114 RAW MATERIAL CHUTE
115 MIXING BOWL
115A NOZZLE
116 CUP SUPPLY APPARATUS
117 CUP RECEIVER
118 WASTE BUCKET
119A STEAM EXHAUST TUBE
119B STEAM EXHAUST TUBE
120A BLOWER FAN
120B BLOWER FAN

FIG.17

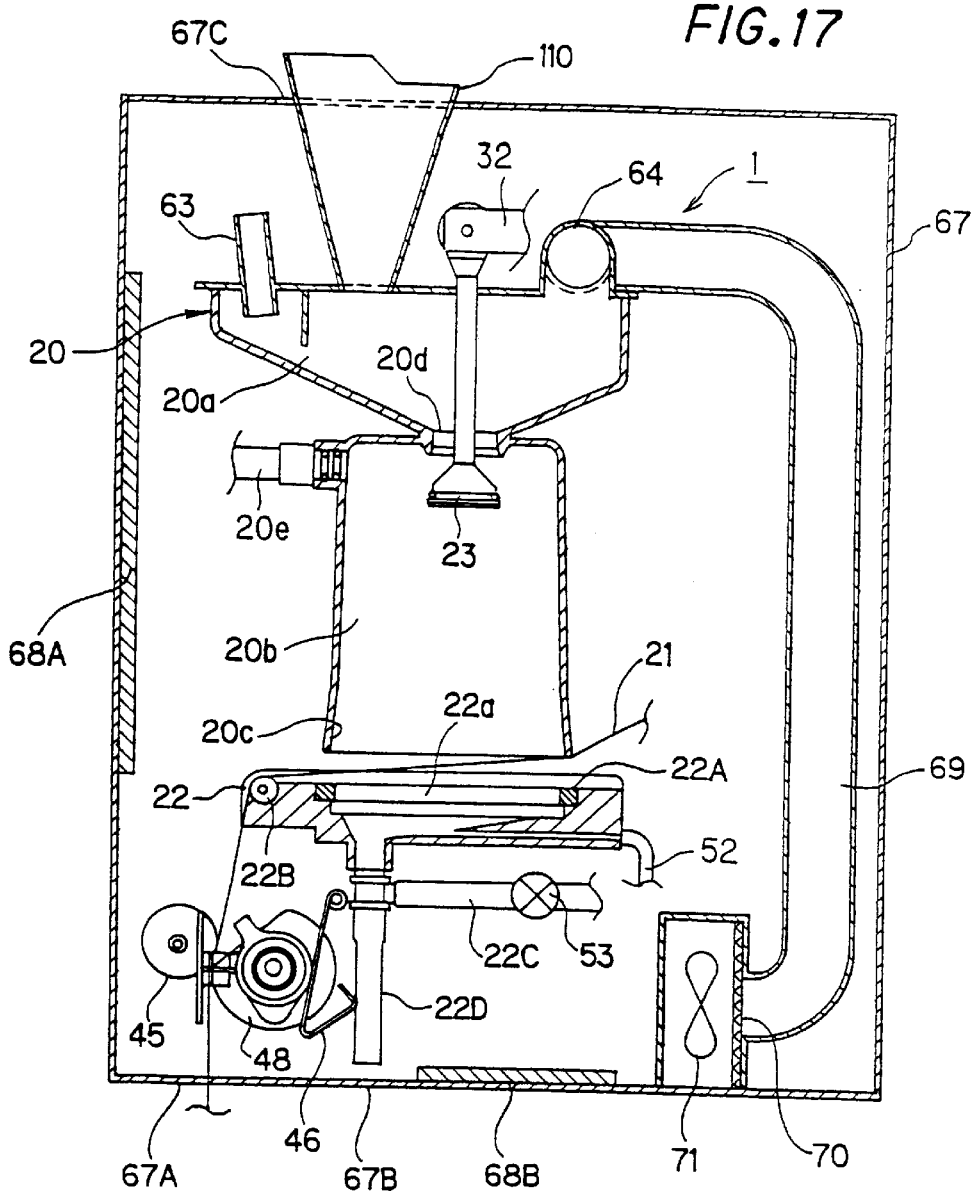

1 BEVERAGE EXTRACTION CHAMBER
20 CYLINDER
20a RECEIVING CHAMBER
20b EXTRACTION CHAMBER
20c OUTLET
20d CONDUIT
20e INLET
21 PAPER FILTER
22A RUBBER SEAL
22B ROLLER
22C BEVERAGE SUPPLY TUBE
22D DRAIN TUBE
23 VALVE
32 LEVER
45 GUIDE ROLLER
46 PRESSURE PLATE

48 PRESSING CAM
52 AIR PIPE
53 BEVERAGE SUPPLY VALVE
63 HOT WATER INLET
64 STEAM OUTLET
67 CASE
67A WASTE OUTLET
67B DRAIN TUBE GUIDE
67C RAW MATERIAL CHUTE GUIDE
68A HEATER
68B HEATER
69 STEAM EXHAUST TUBE
70 FILTER
71 BLOWER FAN
110 RAW MATERIAL CHUTE

BEVERAGE SERVING APPARATUS

This application is a Divisional of application Ser. No. 09/221,133 filed Dec. 28, 1998 now U.S. Pat. No. 6,085,637.

FIELD OF THE INVENTION

This invention relates to a beverage serving apparatus, and more particularly to a beverage serving apparatus in which a hot beverage such as coffee, black tea, woolong tea, green tea, etc. is extracted from a raw material thereof.

BACKGROUND OF THE INVENTION

A typical conventional beverage serving apparatus in which a beverage such as coffee is extracted from a raw material such as coffee beans so as to be served in a cup is shown in FIG. 1. The beverage serving apparatus shown in FIG. 1 consists of water supply unit 100A and beverage preparation unit 100B.

Water supply unit 100A is provided with reservoir 101 for storing tap water, water supply pump 102 for transporting the water stored in reservoir 101 under pressure through water supply tubes 102A and 102B, cold water tank 103 storing cold water for cooling the water flowing in water supply tube 102A, cold water supply valve 104 for discharging the cold water cooled in cold water tank 103 in accordance with a serving command for cold syrup juice, hot water tank 105 for heating the water supplied thereto through water supply tube 102B and storing the hot water thus obtained, hot water supply valve 106A for supplying the water stored in hot water tank 105 to hot water supply tube 107A in accordance with a serving command for regular coffee, hot water supply valve 106B for supplying the water stored in hot water tank 105 to hot water supply tube 107B in accordance with a serving command for instant coffee, and re-heating heater block 108 for heating again the hot water flowing in hot water supply tubes 107A and 107B.

Tap water is supplied to reservoir 101 from water supply tube 101b through water supply valve 101a. The water stored in reservoir 101 passes, on the one hand, through water supply tube 102A having cold water supply valve 104 thereon so as to be discharged out of cold water-supplying nozzle 104A and, on the other hand, through water supply tube 102B having water supply valve 102C thereon to hot water tank 105. The cold water cooled in cold water tank 103 is discharged out of cold water-supplying nozzle 104A at an end of water supply tube 102A. Hot water tank 105 is provided with heater 105A for heating the water in the tank to a temperature not lower than a predetermined temperature (for example, 95).

Beverage preparation unit 100B is provided with regular coffee canister 109 for storing the powdered raw material (raw material, hereinbelow) for regular coffee to be supplied to beverage extraction unit 100C (explained below) ; raw material chute 110 for receiving the raw material for regular coffee; beverage extraction unit 100C for mixing the raw material and hot water supplied from hot water supply tube 107B and extracting regular coffee to be supplied to beverage supply tube 22C; sugar canister 111 for storing sugar to be supplied to raw material chute 114; instant coffee canister 112 for storing powdered instant coffee to be supplied to raw material chute 114; milk canister 113 for storing milk to be supplied to raw material chute 114; raw material chute 114 for receiving sugar, instant coffee and milk to be supplied to mixing bowl 115 (explained below); mixing bowl 115 for mixing sugar, milk, raw material and hot water to prepare coffee to be served; cup supply apparatus 116 for storing and supplying cups C; cup receiver 117 for receiving cup C supplied from cup supply apparatus 116; waste bucket 118 for receiving and storing wastes, being placed under cup receiver 117; and steam exhaust tubes 119A and 119B having blower fan 120 at distal ends thereof, for exhaling steam produced in beverage extraction unit 100C and mixing bowl 115.

Regular coffee canister 109 has outlet 109A. The raw material stored in regular coffee canister 109 is discharged from outlet 109A and supplied to beverage extraction unit 100C by way of raw material chute 110 in accordance with a serving command for regular coffee. Sugar canister 111 has outlet 111A, from which sugar stored in sugar canister 111 is discharged from and supplied to raw material chute 114 in accordance with a serving command for regular coffee or instant coffee, either with sugar. Instant coffee canister 112 has outlet 112A, from which the raw material for instant coffee stored in instant coffee canister 112 is discharged to raw material chute 114 in accordance with a serving command for instant coffee. Milk canister 113 has outlet 113A, from which milk stored in milk canister 113 is discharged to raw material chute 114 in accordance with a serving command for regular coffee or instant coffee, either with milk.

Mixing bowl 115 has nozzle 115A. Regular coffee supplied from beverage supply tube 22C, sugar, milk and the raw material for instant coffee supplied by way of raw material chute 114, and hot water supplied from hot water supply tube 107B are selectively received by mixing bowl 115, in accordance with a serving command for a coffee beverage, and supplied to cup C through nozzle 115A. Cups C stored in cup supply apparatus 116 are supplied to cup receiver 117 and placed at the position to receive cold water discharged from nozzle 104A (in water supply unit 100A), the coffee beverage discharged from nozzle 115A and, in addition, syrup supplied from a syrup canister, not shown. Cold water, the coffee beverage or syrup is thus received by cup C. Steam produced in beverage extraction unit 100C and mixing bowl 115 is exhaled through steam exhaust tubes 119A and 119B, respectively, by the help of blower fan 120 provided at their distal ends, in order to prevent outlets 109A, 111A, 112A and 113A of canisters 109, 111, 112 and 113, respectively, from being choked by steam.

Beverage extraction unit 100C is provided with cylinder 20 for agitating the mixture of the raw material supplied from regular coffee canister 109 with hot water supplied from hot water supply tube 107A and discharging the mixture downward, paper filter 21 for filtering the mixture discharged from cylinder 20, beverage receiver 22 for receiving regular coffee extracted by filtration with paper filter 21 and supplying it to beverage supply tube 22C, air pump 5 for supplying compressed air to cylinder 20 and beverage receiver 22 through upper air valve 50 and lower air valve 51, respectively, and heater block 121 for heating cylinder 20 to prevent lowering of the temperature of hot mixture in cylinder 20.

Cylinder 20 is supported by a guide rail, not shown, to be movable up and down. Paper filter 21 is located under cylinder 20 to receive the mixture prepared therein. Cylinder 20 consists of receiving chamber 20a for receiving the raw material and hot water, and extraction chamber 20b for extracting the beverage from the mixture of the raw material and hot water received in receiving chamber 20a. Receiving chamber 20a and extraction chamber 20b are communicated with each other through a conduit (not shown) which is opened and closed by a valve (not shown).

Upper air valve 50 and lower air valve 51 are each opened and closed according to the state of extraction in beverage extraction unit 100C. In the agitation process, upper air valve 50 is closed and lower air valve 51 is opened so as to supply compressed air from air pump 5 to beverage receiver 22. In the extraction process, upper air valve 50 is opened and lower air valve 51 is closed so as to supply compressed air to the upper part of extraction chamber 20b from air pump 5.

Heater block 121 is provided with heater 121A inside. Heater block 121 mounted on the outer surface of extraction chamber 20b serves to heat cylinder 20, thereby the temperature of hot water within cylinder 20 is prevented from lowering due to transfer of the heat to cylinder 20 from the hot water.

The operation of preparing regular coffee in the beverage preparation unit above will be explained. When a command for serving regular coffee with sugar and mild is given, cylinder 20 is descended, being driven by a motor not shown, so that the bottom of extraction chamber 20b comes into contact with beverage receiver 22, having paper filter 21 interposed between them. Then, the raw material supplied from regular coffee canister 109 through outlet 109A is received by raw material chute 110 and thrown into receiving chamber 20a in cylinder 20, having the conduit therein opened. At the same time, hot water supply valve 106A is opened to supply hot water stored in hot water tank 105 to receiving chamber 20a in cylinder 20 through hot water supply tube 107A heated by heater block 108. The raw material and hot water received in receiving chamber 20a is supplied to extraction chamber 20b, because the conduit between them is opened. The mixture in extraction chamber 20b does not flow out to beverage supply tube 22C because a valve (not shown) provided on beverage supply tube 22C just below beverage receiver 22 is closed. At the same time, blower fan 120 operates to exhale steam generated in receiving chamber 20a to the atmosphere through steam exhaust tube 119A.

Then, upper air valve 50 is closed, lower air valve 51 is opened and air pump 5 is driven, thereby compressed air is supplied to beverage receiver 22. Compressed air supplied to beverage receiver 22 passes through paper filter 21, flows into extraction chamber 20b and passes through the mixture within extraction chamber 20b to form bubbles, thus the flow of the bubbles agitates the mixture.

After a predetermined time for agitation process elapses, air pump 5 is stopped, and the conduit in cylinder 20 is closed by displacement of the valve (not shown) attached to the conduit. Thereafter, the valve on beverage supply tube 22C is opened, upper air valve 50 is opened, lower air valve 51 is closed and air pump 5 is driven, thereby compressed air is supplied to the space in the upper part of extraction chamber 20b. Thereby, the mixture of the raw material with hot water in extraction chamber 20b is pressed down by the compressed air in the upper space thereof, discharged therefrom, and filtered by paper filter 21 to produce regular coffee, which is transported through beverage supply tube 22C to mixing bowl 115.

Meanwhile, sugar and milk are discharged from outlet 111A of sugar canister 111 and outlet 113A of milk canister 113A, respectively, and supplied to mixing bowl 115 by way of raw material chute 114 so as to form regular coffee with sugar in mixing bowl 115. Steam generated then in mixing bowl 115 is exhaled through steam exhaust tube 119B out of blower fan 120 to the atmosphere. Regular coffee with sugar and milk prepared in mixing bowl 115 is poured into cup C from nozzle 115A.

In the beverage preparation apparatus, cylinder 20 is heated by heater block 121 mounted on the outer surface of extraction chamber 20b, thereby transfer of heat from the hot water in extraction chamber 20b during agitation and extraction is retarded, facilitating supply of a hot beverage by extraction.

Meanwhile, another conventional beverage serving apparatus prevented from temperature lowering of the extracted beverage is disclosed, for example, in Japanese Patent Application Laid Open No. Hei5-197878. In the beverage serving apparatus, the main components such as cylinder and beverage receiver are contained in a case, and air in the case is heated by a heater to keep the main parts hot.

In the conventional beverage serving apparatus shown in FIG. 1, however, heat is radiated from the outer surface of extraction chamber despite the extraction chamber 20b is heated locally by a heater block, thus it is difficult to serve a hot beverage by extraction.

Further, a blower fan is used in the apparatus both for exhaust from the receiving chamber for mixing the raw material with hot water and for exhaust from the mixing bowl for addition of milk and sugar to the beverage, in common. This means that the exhaust from the mixing bowl is accompanied by the exhaust from the beverage extraction unit when serving another kind of beverage is requested, enhancing the aforesaid heat radiation and, thus, making it difficult to serve a hot beverage. This is also the case for the apparatus in Japanese Patent Application Laid Open No. Hei5-197878.

SUMMARY OF THE INVENTION

Accordingly, it is an object of the invention to provide a beverage serving apparatus which facilitates serving of a hot beverage by extraction, being reduced in heat loss particularly from the extraction unit.

According to the first feature of the invention, a beverage serving apparatus in which a hot beverage is prepared by extraction comprises:

extracting means for mixing a raw material for the hot beverage with hot water and extracting the hot beverage from the raw material mixed with the hot water;

a plate for radiating far-infrared rays by being heated, facing the extracting means with a predetermined distance separating the far-infrared radiating plate from the extracting means; and means for heating the far-infrared-radiating plate.

According to the second feature of the invention, a beverage serving apparatus in which a hot beverage is prepared by extraction comprises:

means for receiving a raw material for the hot beverage and hot water;

extracting means for mixing the raw material with the hot water received in the receiving means and extracting the hot beverage from the raw material mixed with the hot water to prepare an extracted beverage;

means for mixing an additive, such as sugar, milk, etc., to the extracted beverage;

first exhaling means for exhaling steam from the receiving means; and second exhaling means for exhaling steam from the mixing means, the second exhaling means being independent of the first exhaling means.

According to the third feature of the invention, a beverage serving apparatus in which a hot beverage is prepared by extraction comprises:

means for receiving a raw material for the hot beverage and hot water;

extracting means for mixing the raw material with the hot water received in the receiving means and extracting the hot beverage from the raw material mixed with the hot water to prepare an extracted beverage;

a plate for radiating far-infrared rays by being heated, facing the extracting means with a predetermined distance separating the far-infrared-radiating plate from the extracting means;

means for heating the far-infrared-radiating plate;

means for mixing an additive, such as sugar, milk, etc., to the extracted beverage;

first exhaling means for exhaling steam from the receiving means; and second exhaling means for exhaling steam from the extracting means, the second exhaling means being independent of the first exhaling means.

According to the fourth feature of the invention, a beverage serving apparatus in which a hot beverage is prepared by extraction comprises:

means for receiving a raw material for the hot beverage and hot water;

extracting means for mixing the raw material with the hot water received in the receiving means and extracting the hot beverage from the raw material mixed with the hot water;

means for casing the receiving means and the extracting means; and means for circulating steam generated in the receiving means on or inside of the casing means.

BRIEF DESCRIPTION OF THE DRAWINGS

The invention will be described in more detail in conjunction with the accompanying drawings, wherein:

FIG. 1 is an explanatory view of a conventional beverage serving apparatus;

FIG. 2 is an explanatory view of the beverage extraction unit in the first preferred embodiment of beverage serving apparatus according to the invention;

FIG. 7 is a timing chart with respect to the output signals of the first, second and process regulation sensors in the first preferred embodiment;

FIG. 8A to 8D are explanatory views of the beverage extraction unit in the first preferred embodiment in the stand-by status;

FIG. 9A to 9D are explanatory views of the beverage extraction unit with the drain tube closed in the first preferred embodiment;

FIG. 10A to 10D are explanatory views of the beverage extraction unit in the first preferred embodiment in the agitation process;

FIG. 11A to 11D are explanatory views of the beverage extraction unit in the first preferred embodiment in the extraction process;

FIG. 12A to 12D are explanatory views of the beverage extraction unit in the first preferred embodiment in the waste disposal process;

FIG. 13A to 13D are explanatory views of the beverage extraction unit in the first preferred embodiment in which the waste disposal process is finished;

FIG. 16 is an explanatory view of the beverage serving apparatus in the second preferred embodiment of the invention; and FIG. 17 is an explanatory view of the beverage extraction unit in the third preferred embodiment of beverage serving apparatus according to the invention.

PREFERRED EMBODIMENTS OF THE INVENTION

Figure 3:
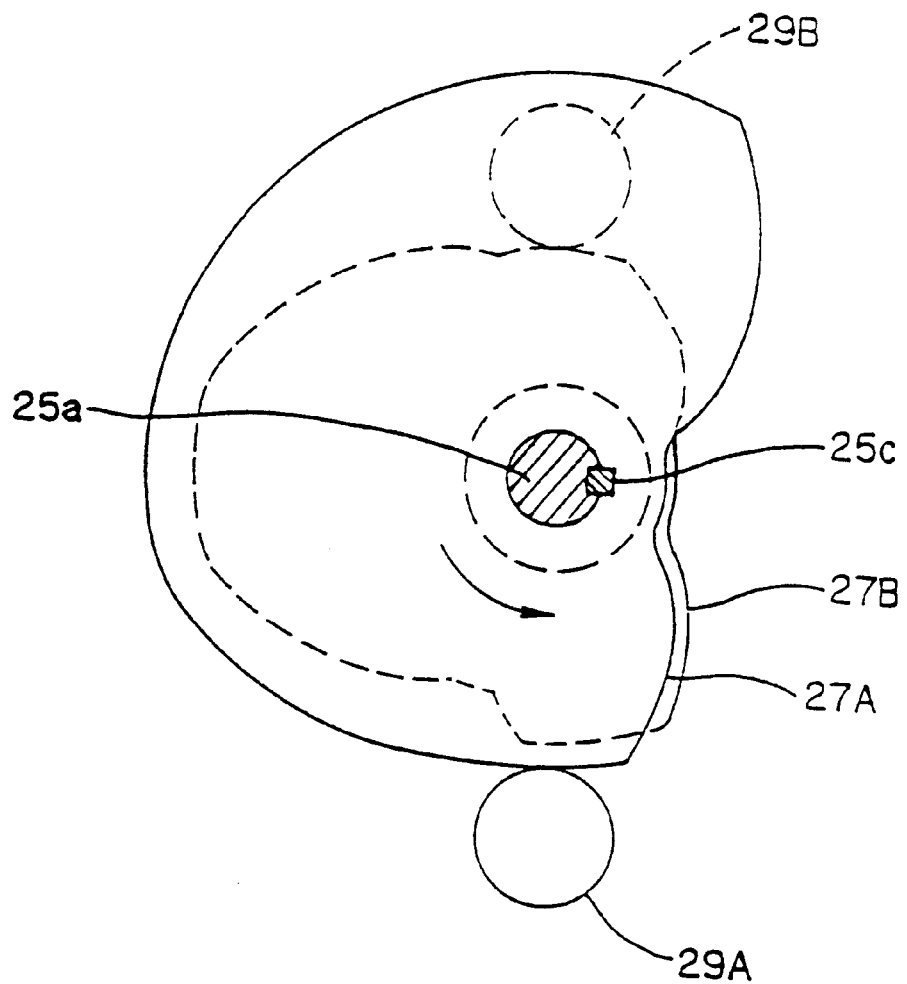
FIG. 3 is a cross-sectional view, along the plane indicated by line A—A, of the beverage extraction unit in the first preferred embodiment of beverage serving apparatus.

The preferred embodiments of the invention will be described in more detail with reference to the drawings.

FIG. 2 shows the constitution of the beverage extraction unit in the first preferred embodiment of beverage serving apparatus according to the invention. The beverage serving apparatus in the first preferred embodiment of the invention has the constitution similar to the conventional beverage serving apparatus shown in FIG. 1 except that in the beverage extraction unit (100C in FIG. 1). Accordingly, the signs used in FIG. 1 are referred to in the description of the beverage serving apparatus in the preferred embodiments to indicate the similar members for the sake of simplicity. Beverage extraction unit 1 consists of extraction unit 2 for extracting regular coffee (the beverage, hereafter) from the mixture of powdered raw material for regular coffee with hot water, waste processing unit 4 for discarding the waste, and air pump 5 for supplying compressed air to each part of beverage extraction unit 1. The powdered raw material is supplied from regular coffee canister 109. Hot water is supplied from hot water tank 105.

Extraction unit 2 is provided with cylinder 20 for transporting downward the mixture of the raw material with hot water supplied from above, paper filter 21 for filtering the mixture discharged from cylinder 20, beverage receiver 22 for receiving the beverage extracted by filtration through paper filter 21, and heating system 60 for heating cylinder 20 to prevent temperature lowering of the extracted beverage. Cylinder 20 is supported by a guide rail, not shown, to be movable up and down. Paper filter 21 is placed under cylinder 20.

Cylinder 20 is provided with receiving chamber 20a for receiving the raw material supplied by way of raw material chute 110 (refer to FIG. 1) and hot water supplied through hot water supply tube 107A (refer to FIG. 1), and extraction chamber 20b for extraction of the beverage. Hot water is introduced into receiving chamber 20a through hot water inlet 63 provided in the upper part of receiving chamber 20a. Receiving chamber 20a is provided with steam outlet 64 connected with steam exhaust tube 119A (refer to FIG. 1). The mixture of the powdered raw material and hot water is discharged from outlet 20c provided under extraction chamber 20b. Receiving chamber 20a and extraction chamber 20b are communicated with each other by way of conduit 20d. Conduit 20d is opened and closed by means of valve 23. Extraction chamber 20b has inlet 20e for introducing compressed air from air pump 5.

Heating system 60 consists of cylindrical metal plate 61 for radiating far-infrared by being heated and heater 62 for heating cylindrical metal plate 61. Cylindrical metal plate 61 is so arranged as to surround cylinder 20 with a predetermined distance separating each other. Far-infrared rays are radiated by cylindrical metal plate 61 when it is heated because it is subject to alumite-processing. Heater 62 is mounted on the outer surface of cylindrical metal plate 61 and provided with terminal 62A to which a predetermined voltage is applied by means of a heater drive unit (described later) in order to heat cylindrical metal plate 61.

Paper filter 21 in the form of a roll is set on axis 21A to be rotatable around it, and can be unwound from the roll to the left in FIG. 2 by waste processing motor 40 in waste processing unit 4 described later. The shortage of paper filter 21 is detected by means of filter amount detecting lever 21B and filter shortage sensor 21C such as a micro-switch. Filter amount detecting lever 21B is supported to be rotatable at the proximate end and always in contact with the roll of paper filter 21 at the distal end or in the middle portion thereof. When paper filter 21 runs short and filter amount detecting lever 21B is rotated to put filter shortage detecting sensor 21C in switching action so that a signal indicating the shortage of paper filter 21 is outputted to control unit 6, described later, to be used for alarm and so on.

Beverage receiver 22 has, in the upper part thereof, opening 22a which can be contacted with cylinder 20. Rubber seal 22A is provided around opening 22a to prevent leakage of the mixture. Roller 22B for changing the direction of running of paper filter 21 is provided at one end of beverage receiver 22. Beverage supply tube 22C for supplying the beverage to the serving cup portion and drain tube 22D for discarding the beverage are provided in the lower part of beverage receiver 22. Beverage supply tube 22C is provided with beverage supply valve 53 to permit and prohibit flow of the beverage through beverage supply tube 22C.

Extraction unit 2 is provided further with extraction motor 24, reducing unit 25 for reducing the rate of rotation of extraction motor 24 to a predetermined rate having output axes 25a and 25b projecting from either side, supporting plate 26 supporting an end of output axis 25a by bearing 26a, cylinder cam 27A and valve cam 27B fixed on output axis 25a, cylinder driving plate 28A for driving cylinder 20, valve driving plate 28B for driving valve 23, cylinder cam follower 29A fixed on cylinder driving plate 28A, valve cam follower 29B fixed on valve driving plate 28B, drawing coil spring 30 for drawing cylinder driving plate 28A and valve driving plate 28B closer to each other to come into contact with cylinder cam 27A and valve cam 27B, respectively, connecting members 31A, 31B and 31C connecting cylinder 20 with cylinder driving plate 28A, lever 32 connected with valve 23 rotatably by pin 32a, connecting member 33 mounted on valve driving plate 28B to be connected with lever 32 rotatably by pin 32b, engaging member 28c mounted on valve driving plate 28B, drawing coil spring 30 engaged with the proximal end of lever 32 and engaging member 28c at respective ends, waste processing motor 40, and reducing unit 41 for reducing the rate of rotation of waste processing motor 40 to a predetermined rate having output axis 41a.

Drawing coil spring 30 is engaged at one end with engaging member 28a mounted on cylinder driving plate 28A and engaged at the other end with engaging member 28b mounted on valve driving plate 28B. Extraction unit 2 is so arranged to complete a series of processes, agitation process, extraction process and waste disposal process, in accordance with a rotation of output axes 25a, 25b and 41a, respectively.

A process regulation system for regulating the progress of each process is provided on the side having output axis 25b of reducing unit 25. In more detail, output axis 25b is provided with first, second and third process regulation plates, 35A, 35B and 35C, around which first, second and third process regulation sensors, 36A, 36B and 36C, respectively, such as photo-sensors, are provided in order to detect (for example, to output an off signal by shading light) angular positions of first, second and third process regulation plates, 35A, 35B and 35C, respectively.

Air pump 5 is connected with air pipe 52 which leads to beverage receiver 22 and inlet 20e attached to extraction chamber 20b. Air pipe 52 is provided with upper air valve 50 operated electromagnetically near inlet 20e of extraction chamber 20b and with lower air valve 51 operated electromagnetically near beverage receiver 22.

FIG. 3 is a cross-sectional view of the apparatus shown in FIG. 2, along the plane indicated by line A—A. Cylinder cam 27A and valve cam 27B are fixed to output axis 25a of reducing unit 25 by way of key 25c. Their cam surfaces have the shapes as shown in FIG. 3.

Figure 4:
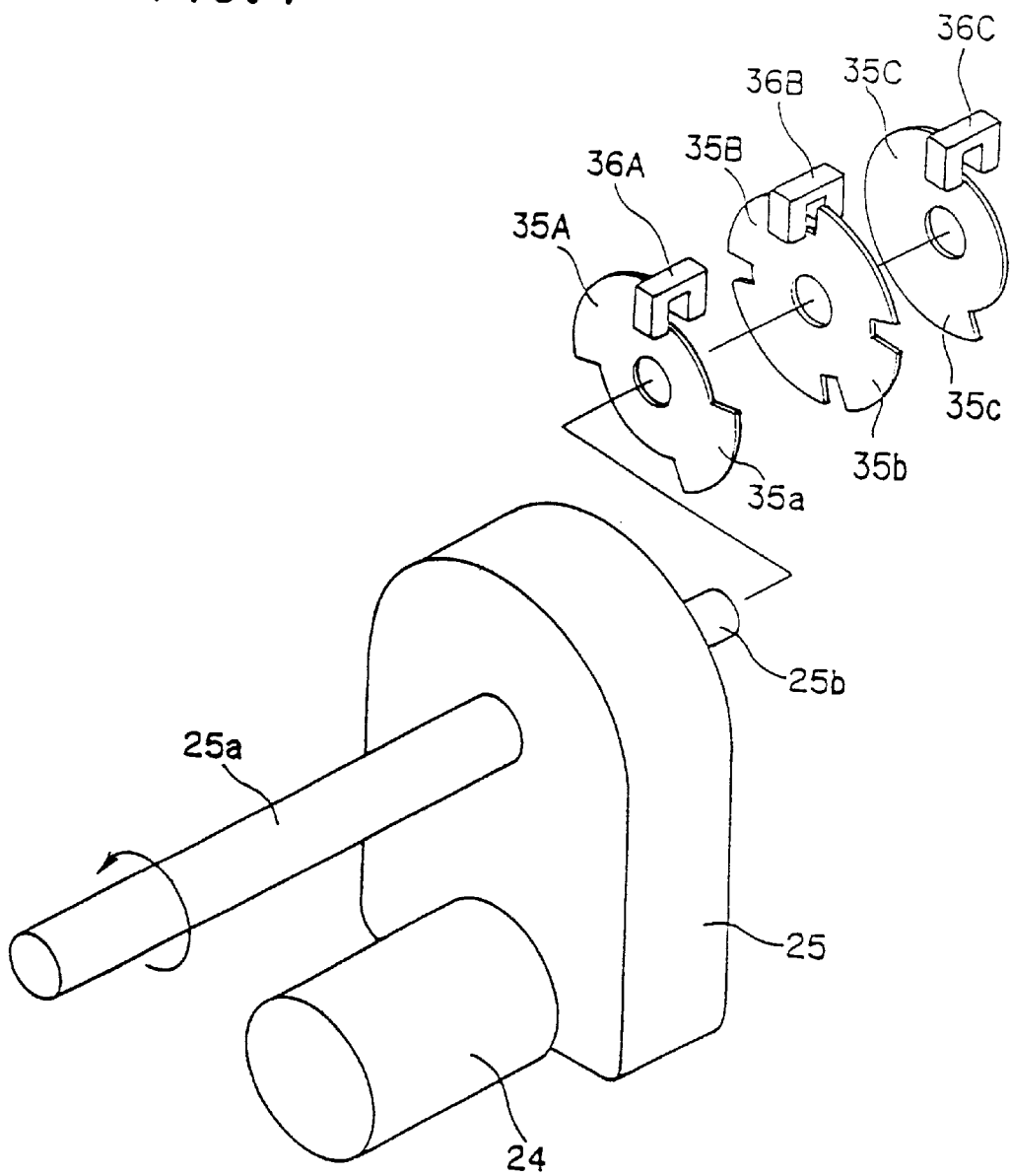
FIG. 4 is a perspective view of the process regulation system in the first preferred embodiment.

FIG. 4 is a perspective view of the process regulation system. Protrusions 35a are formed at two positions on first process regulation plate 35A, encompassing about 90 degrees. Protrusions 35b are formed at four positions on second process regulation plate 35B, encompassing about 70 degrees. Protrusion 35c is formed on third process regulation plate 35C, encompassing about 180 degrees.

Figure 5:
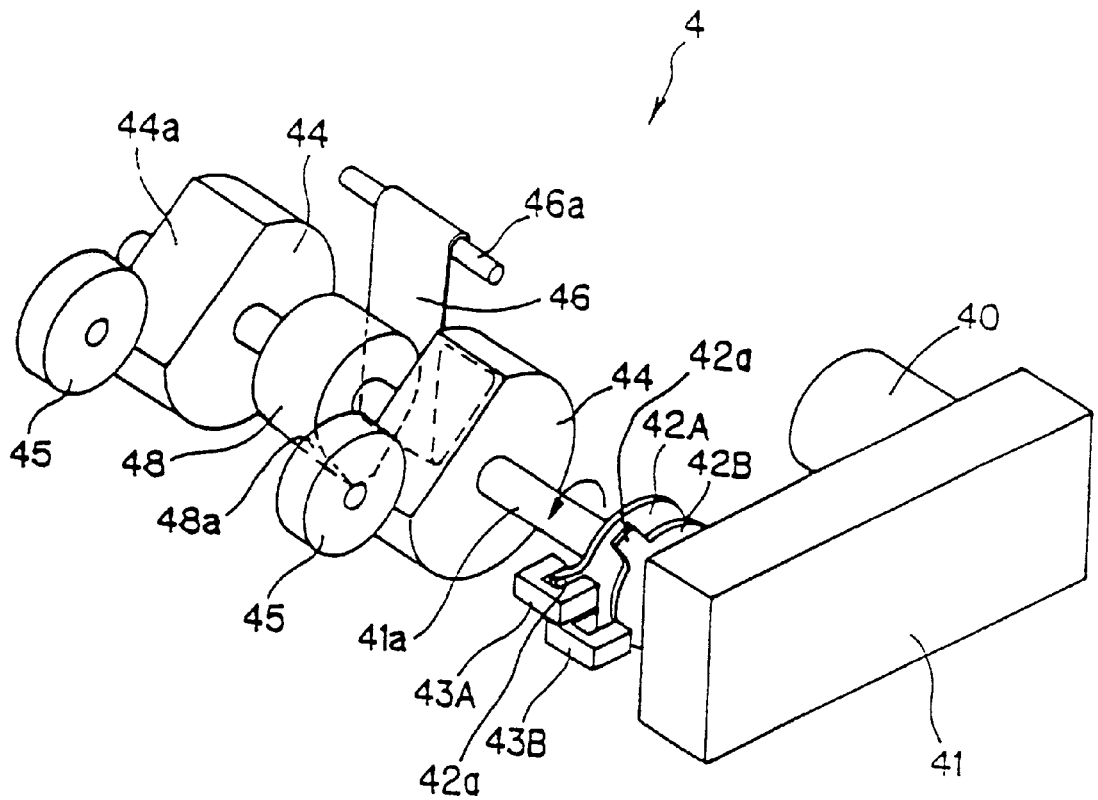
FIG. 5 is a perspective view of the waste processing unit in the first preferred embodiment.

FIG. 5 is a brief perspective view of waste processing unit 4. Waste processing unit 4 is provided with waste processing motor 40, reducing unit 41 for reducing the rate of rotation of waste processing motor 40 to a predetermined rate, drain tube opening detection plate 42A and drain tube closing detection plate 42B fixed to output axis 41a of reducing unit 41, drain tube opening detection sensor 43A, drain tube closing detection sensor 43B, a pair of filter supply rollers 44, a pair of guide rollers 45 for pressing paper filter 21 toward filter supply rollers 44, pressure plate 46 for closing drain tube 22D, and pressing cam 48 for causing pressure plate 46 to rotate. Drain tube opening detection sensor 43A is a detector such as photo sensor which outputs an off signal indicating the opened state (stand-by state) of drain tube 22D in response to blocking of light (such as shutting off) by protrusion of drain tube opening detection plate 42A. Drain tube closing detection sensor 43B is a detector such as photo sensor which outputs an off-signal indicating the closed state of drain tube 22D in response to blocking of light (such as shutting off) by protrusion of drain tube closing detection plate 42B. Filter supply rollers 44, 44 are a pair of rollers, fixed to output axis 41a, each having indentation 44a on the periphery and serve to unwind a roll of paper filter 21 to supply a predetermined length of paper filter 21. Guide rollers 45, 45 serve to press paper filter 21 toward filter supply rollers 44, 44 by means of springs not shown. Pressure plate 46 is consisting of a planar spring or the like pressing discharge tube 22D toward stationary plate 47 (refer to FIG. 2) so as to close discharge tube 22D. Pressing cam 48 is fixed to output axis 41a and has protrusion 48a on the periphery, which serves to allow pressure plate 46 to turn.

Figure 6:
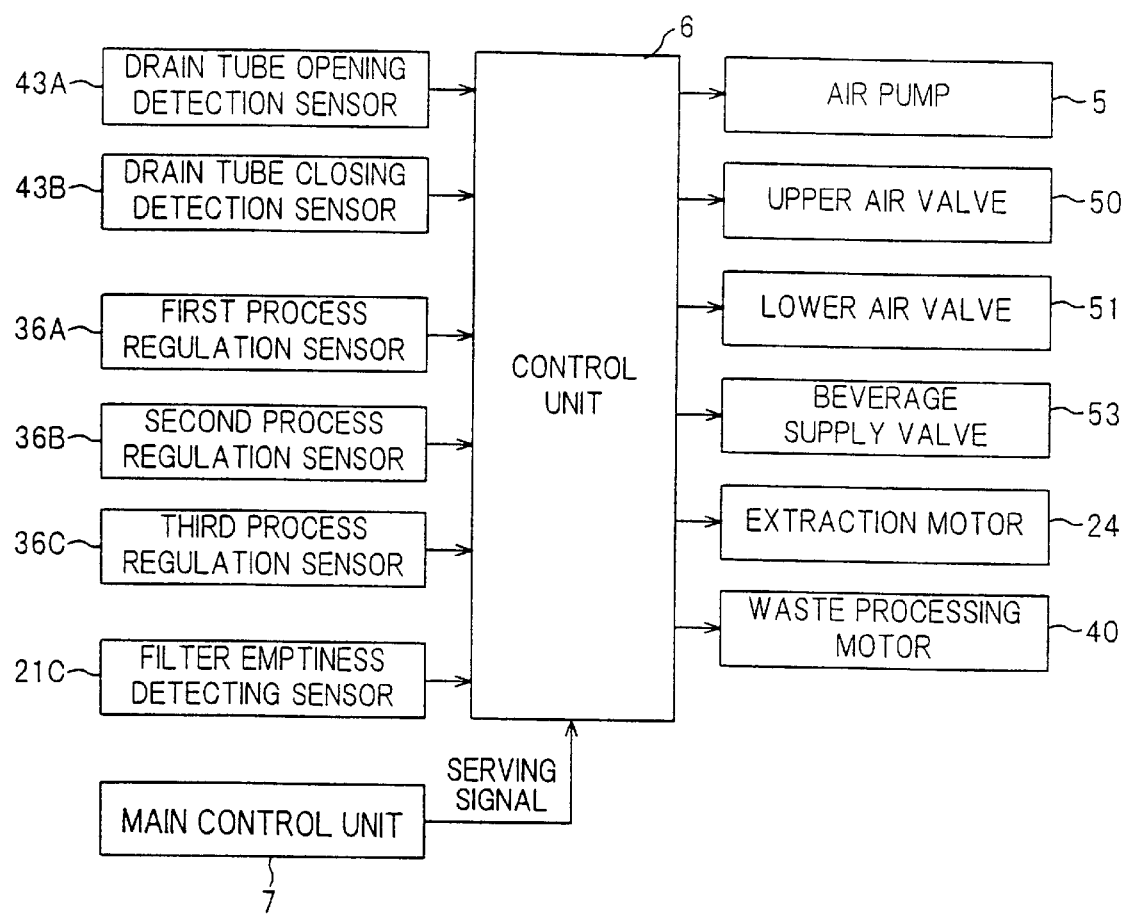
FIG. 6 is a block diagram of the control system in the first preferred embodiment.

FIG. 6 is a block diagram of the control system for beverage extraction apparatus 1 according to the invention. Control system 6 serves to control each part of beverage extraction apparatus 1. With control system 6, there are connected drain tube opening detection sensor 43A, drain tube closing detection sensor 43B, first, second and third process regulation sensors 36A, 36B and 36C, respectively, filter shortage-detecting sensor 21C, air pump 5, upper air valve 50, lower air valve 51, beverage supply valve 53, extraction motor 24, waste processing motor 40, heater-driving unit 62B, and main control unit 7 for controlling serving of the extracted beverage.

A serving signal is outputted from main control unit 7 to control unit 6 every time when the extracted beverage should be served. Control unit 6 to which the serving signal is inputted from main control unit 7 controls extraction motor 24, waste processing motor 40 and air pump 5 so as to proceed a series of processes including agitation process, extraction process and waste disposal process.

The operation of beverage extraction apparatus 1 will be explained with reference to FIG. 7 to Figs.13A to 13D. FIG. 7 indicates the signals outputted from first, second and third process regulation sensors 36A, 36B and 36C, respectively. FIGS. 8A to 13A, FIGS. 5B to 13B and FIGS. 8C to 13C show the operation of beverage extraction apparatus 1. FIGS. 8A to 13A show the positions of main components (cylinder 20, valve 23, etc.) FIGS. 8B to 13B show the positions of drain tube opening detection plate 42A, drain tube closing detection plate 42B and filter supplying roller 44. FIGS. 8C to 13C show the positions of cylinder cam 27A and valve cam 27B. FIGS. 8D to 13D show the positions of first, second and third process regulation plates 35A, 35B and 35C, respectively.

(1) Stand-by State (FIGS. 8A to 8D)

In the stand-by state, main parts of beverage extraction unit 1 take the stand-by position P1 shown in FIG. 7 and FIGS. 8A to 8D. In detail, first, second and third process regulation sensors 36A, 36B and 36C, respectively, are on, drain tube opening detection sensor 43A is off, and drain tube closing detection sensor 43B is on. Pressure plate 46 is in contact with pressing cam 48 by elastic force of drain tube 22D.

A predetermined voltage is applied to terminal 62A of heating system 60 by means of heater driving circuit 62B so as to heat the whole of cylinder 20 to a predetermined temperature by heat generated by heater 62 and far-infrared rays radiated by cylindrical metal plate 61, thereby cylinder 20 is kept hot.

(2) Agitation Process (FIGS. 9A to 9D and FIGS. 10A to 10D)

When the serving signal is outputted from main control unit 7, control unit 6 executes the operation of transfer from stand-by position P1 to agitation position P2 according to first and third process regulation sensors, 36A and 36C, being on, as long as second process regulation sensor 36B is on.

Control unit 6 causes waste processing motor 40 to rotate in the normal direction (output axis 41a rotates anti-clockwise in FIG. 9A). The driving torque of waste processing motor 40 is transmitted through reducing unit 41 to output axis 41a (refer to FIG. 5), which is rotated 60 degrees in the normal direction (anti-clockwise in FIG. 9A), whereby protrusion 48a of pressing cam 48 presses pressure plate 46, as shown in FIG. 9A, so that drain tube 22D is pinched between pressure plate 46 and stationary plate 47 to be closed. Drain tube closing detection sensor 43B is shaded by protrusion of drain tube closing detection plate 42B to output an off-signal to control unit 6, which then allows waste processing motor 40 to stop, according to the off-signal from drain tube closing detection sensor 43B.

Then, control unit 6 allows extraction motor 24 to rotate in the normal direction (to rotate output axis 25b anti-clockwise as shown in FIG. 10D by arrows). The driving torque of extraction motor 24 is transmitted through reducing unit 25 (refer to FIG. 4) to output axes 25a and 25b to rotate the axes in the normal direction (anticlockwise rotation of output axis 25b in FIG. 10D). The rotation of output axes 25a and 25b in the normal direction causes cylinder cam 27A and valve cam 27B to rotate in the normal direction, as shown in FIG. 10C, whereby cylinder driving plate 28A and valve driving plate 28B descend. Descending of cylinder driving plate 28A, on the one hand, allows cylinder 20 to descend by way of connecting members 31A, 31B and 31C, and thus the lower end of extraction chamber 20b presses paper filter 21 to beverage receiver 22, thereby paper filter 21 comes into contact with beverage receiver 22. Descending of valve driving plate 28B, on the other hand, allows valve 23 to descend by way of connecting member 33 (refer to FIG. 2) and lever 32. First process regulation sensor 36A is shaded by first process regulation plate 35A to output an off-signal to control unit 6. Then, an on-signal is outputted from second process regulation sensor 36B to control unit 6. On such condition, control unit 6 causes extraction motor 24 to stop according to the off signal from first process regulation sensor 36A. The main part of beverage extraction unit 1 takes agitation position P2 in FIG. 7, which is the state shown in FIGS. 10A to 10D. In this state, on-signals are outputted from second and third process regulation sensors, 36B and 36C, to control unit 6 because they are free from shading by protrusions 35b and 35c of second and third process regulation plates 35B and 35C, respectively, as shown in FIG. 10D.

Control unit 6 executes the agitation process based on the off-signal from first process regulation sensor 36A and the on-signal from third process regulation sensor 36C, as long as second process regulation sensor 36B is outputting an on-signal.

When a signal requesting the raw material and hot water is outputted from control unit 6 to main control unit 7, the raw material and hot water are supplied to receiving chamber 20a according to the control by main control unit 7. At the same time, beverage supply valve 53 is closed, lower air valve 51 is opened and air pump 5 is driven based on the control by control unit 6. Air pump 5 supplies compressed air to beverage receiver 22 through lower air valve 51 and air pipe 52. The compressed air flows into extraction chamber 20b through paper filter 21, whereby the air bubbles agitate the mixture of the raw material and hot water in extraction chamber 20b. The supply of compressed air from the lower surface of paper filter 21 accelerates dissolution of the beverage component of the raw material into the hot water, thereby beverage extraction is completed in a short period.

(3) Extraction Process (Refer to FIGS. 11A to 11D)

Control unit 6 drives extraction motor 24 to rotate in the normal direction after the period for agitation set by a timer axes 25a and 25b, whereby cylinder cam 27A and valve cam 27B are rotated in the normal direction. Because the diameter of cylinder cam 27A is not changed as shown in FIG. 11C, cylinder 20 neither ascends nor descends. Because valve cam 27B is increased in diameter as it is rotated, valve 23 is elevated, as shown in FIG. 11A, to close conduit 20d. Third process regulation sensor 36C is shaded by third process regulation plate 35C to output an off-signal to control unit 6. Then, second process regulation sensor 36B outputs an on-signal to control unit 6. On such condition, control unit 6 causes extraction motor 24 to stop according to the off-signal from third process regulation sensor 36C. The main part of beverage extraction unit 1 is brought to extraction position P3 in FIG. 7, which is the state shown in FIGS. 11A to 11D. In this state, first and second process regulation sensors, 36A and 36B, output on-signals, as shown in FIG. 11D.

Control unit 6 executes the extraction process based on the on-signal from first process regulation sensor 36A and the off-signal from third process regulation sensor 36C, as long as second process regulation sensor 36B is outputting an on-signal.

In the extraction process, upper air valve 50 is opened, lower air valve 51 is closed, beverage supply valve 53 is opened and air pump 5 is operated based on the control by control unit 6. Air pump 5 supplies compressed air through air pipe 52 to extraction chamber 20b through inlet 20e attached thereto. The mixture in extraction chamber 20b is transported downward by the compressed air from air pump 5 and filtered by paper filter 21. The beverage filtered by paper filter 21 is supplied to the serving cup portion through beverage receiver 22 and beverage supply tube 22C. The compressed air supplied to extraction chamber 20b increases the pressure therein so as to press down the mixture toward paper filter 21, whereby the mixture is separated to the beverage and the waste in a short period, the efficiency of extraction being improved.

A beverage of suitable temperature can be served in a cup without loss of heat from hot water or the beverage in cylinder 20 to surroundings because cylinder 20 is kept hot during the agitation process and the extraction process by heat generated by heater 62 and far-infrared rays radiated by cylindrical metal plate 61.

(4) Waste Disposal Process (Refer to FIGS. 12A to 12D and FIGS. 13A to 13D.)

After the period for extraction set by the timer elapses, control unit 6 allows extraction motor 24 to rotate in the normal direction. The driving torque of extraction motor 24 is transmitted through reducing unit 25 (refer to FIG. 4) to output axes 25a and 25b to rotate these axes in the normal direction. Owing to the rotation of output axis 25a, cylinder cam 27A and valve cam 27B rotate in the normal direction (as shown in FIG. 12C) to elevate cylinder driving plate 28A and valve driving plate 28B, respectively, causing cylinder 20 and valve 23 to ascend to the respective uppermost positions. Owing to the rotation of output axis 25b, first and third process regulation sensors, 36A and 36C, are shaded by first and third process regulation plates 35A and 35C, respectively, as shown in FIG. 12D, to output off-signals respectively, to control unit 6. Then, second process regulation sensor 36B outputs an on-signal to control unit 6. On such a condition, control unit 6 causes extraction motor 24 to stop according to the off signals from first and third process regulation sensors, 36A and 36C. The main part of beverage extraction unit 1 takes waste disposal position P4 in FIG. 7 to be in the state shown in FIGS. 12A to 12D, in which second process regulation sensor 36B outputs an on-signal, and residue M of the powdered raw material is left on paper filter 21.

Control unit 6 executes the beverage draining and waste disposal process based on the off-signals from first process regulation sensor 36A and third process regulation sensor 36C, as long as an on-signal is outputted from second process regulation sensor 36B.

Control unit 6 drives waste processing motor 40 in the normal direction. The torque of waste processing motor 40 is transmitted through reducing unit 41 to output axis 41a (refer to FIG. 5), which is rotated in the normal direction, whereby filter supply rollers 44 are rotated to unwind the roll of paper filter 21. When paper filter 21 having residue M thereon passes roller 22B, residue M is folded and separated from paper filter 21 (as shown in FIG. 13A by an imaginary line) and falls into a waste bucket (not shown). Drain tube opening sensor 43A is shaded by drain tube opening detection plate 42A (as shown in FIG. 13B) so as to output an off-signal to control unit 6.

Control unit 6 causes waste disposal motor 40 to stop in response to the off-signal from drain tube opening sensor 43A, The main part of beverage extraction unit 1 is in the state shown in FIGS. 13A to 13D.

(5) Operation Resuming the Stand-by State

After the waste disposal process is finished, control unit 6 drives extraction motor 24 and waste processing motor 40 to rotate in the normal direction. The main part of beverage extraction unit 1 resumes the stand-by state shown in FIGS. 8A to 8D. Thereafter, the operations (1) to (5) above are repeated every time when a serving signal is inputted to control unit 6.

The effect of heating cylinder 20 in the first preferred embodiment will be explained below.

Figure 14:
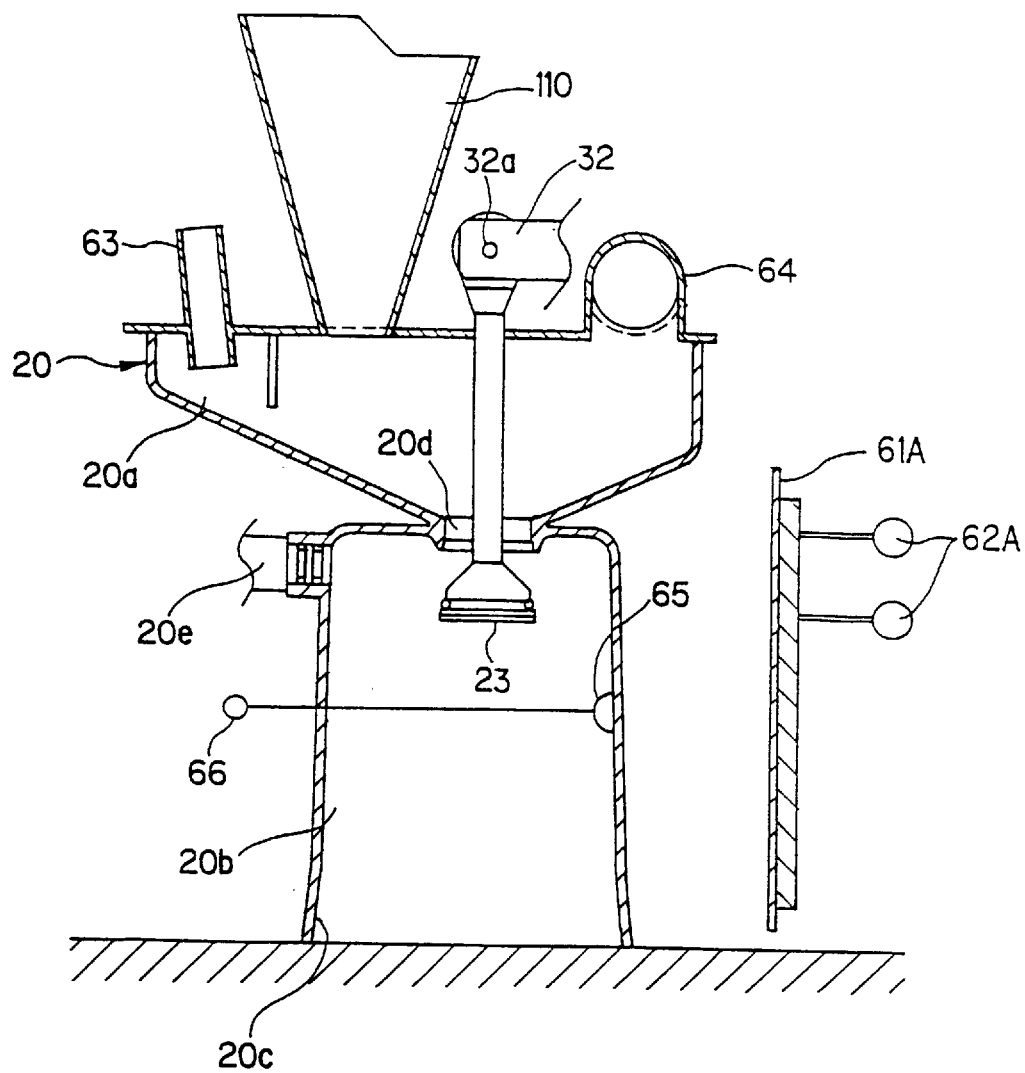
FIG. 14 is an explanatory view showing the experimental apparatus according to the first preferred embodiment.

FIG. 14 shows an experimental apparatus used for confirming the effect of the first preferred embodiment of the invention. Temperature sensor 65 having terminal 66 is mounted on the inner surface of extraction chamber 20b in cylinder 20, around which metal plate 61A is provided, separated 30 mm from cylinder 20. Heater 62 of 40 W in output having terminal 62A is provided on metal plate 61A.

In the experimental apparatus, a measuring instrument, not shown, is connected with terminal 66, and a heater-driving unit is connected with terminal 62A to drive heater 62. The temperatures of metal plate 61A and the inner surface of cylinder 20 when cylinder 20 is heated with heater 62 are measured, in the cases where metal plate 61A is subject to alumite-processing and cylinder 61A is free from alumite-processing, respectively.

Figure 15:
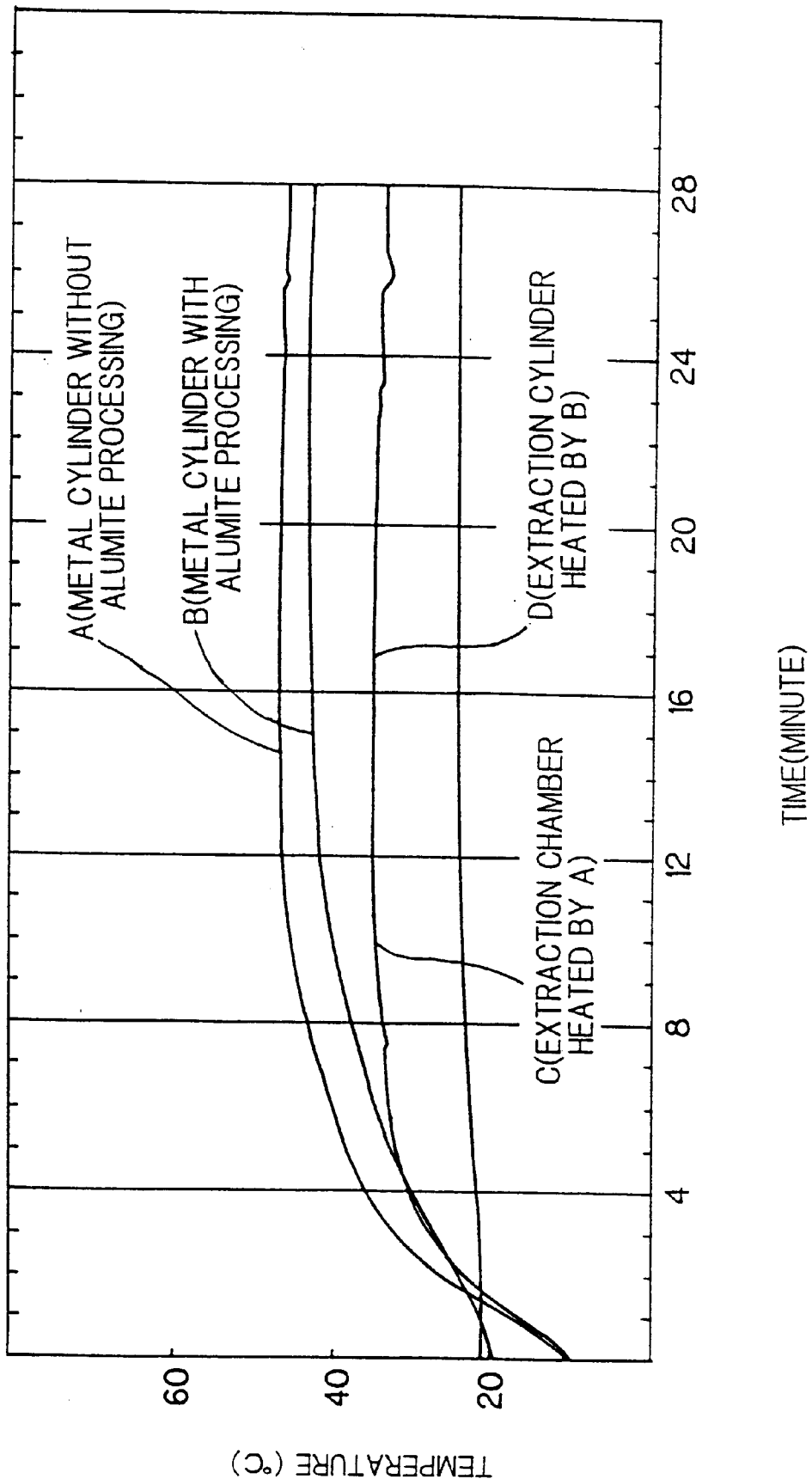
FIG. 15 is a graph showing the experimental results obtained by the experimental apparatus according to the first preferred embodiment.

FIG. 15 shows the results of measurement. Curve A shows the temperature of metal plate 61A when cylinder 20 is heated by the use of metal plate 61A without alumite-processing, curve B shows the temperature of metal plate 61A when cylinder 20 is heated by the use of metal plate 61A alumite-processed, curve C shows the temperature of the inner surface of cylinder 20 when metal plate 61A is alumite-processed, and curve D shows the temperature of the inner surface of cylinder 20 when metal plate 61A is free from alumite-processing. As is seen from the results, when metal plate 61A is alumite-processed, the temperature of metal plate 61A is lower and the temperature of the inner surface of cylinder 20 (extraction chamber 20b) is higher compared with those when metal plate 61A free from alumite-processing is used. The superiority of heating by far-infrared radiation is confirmed.

It is found that cylinder 20 can be heated efficiently by far-infrared radiation and the whole of cylinder 20 can be kept hot enough. Accordingly, the extracted beverage is prevented from lowering of the temperature, and beverages hot enough can be served by the beverage serving apparatus according to the invention. In addition, because no heating member such as heater block is provided on cylinder 20, facility in handling of cylinder 20 is improved when it is detached from the apparatus for maintenance.

In place of an alumite-processed metal plate used for heating system 60 in the embodiment above, a black coated metal cylinder may be used to obtain similar effect. Greater effect is obtained if cylindrical metal 61 is so arranged as to surround cylinder 20 as well as beverage receiver 22.

FIG. 16 shows a beverage serving apparatus in the second preferred embodiment of the invention. The beverage serving apparatus differs from that of the first preferred embodiment in that steam exhaust tubes 119A and 119B are provided with blower fans 120A and 120B, respectively, separately. The apparatus is so arranged that blower fan 120B is driven only when hot water is supplied to receiving chamber 20a in cylinder 20, under the control by control unit 6.

In the apparatus so arranged, blower fan 120B is not driven but blower fan 120A only is driven for removing steam from mixing bowl 115, when serving of a beverage other than that prepared by beverage extraction unit 1 (for example, instant coffee) is requested. The loss of heat from cylinder 20 is suppressed because the air in cylinder stands still without exhaling by blower fan 120B, thus the effect of keeping cylinder 20 hot is enhanced.

FIG. 17 shows the beverage extraction chamber in a beverage serving apparatus in the third preferred embodiment of the invention. Beverage extraction chamber 1 is contained in case 67 having heaters 68A and 68B on the inner surface, so as to heat the air in case 67, to heat thereby beverage extraction chamber 1. Steam exhaust tube 69 is connected with steam outlet 64 on cylinder 20 at the upper end and with blower fan 71 contained in case 67 at the lower end, in order to exhale the steam generated in receiving chamber 20a to the inside of case 67. Filter 70 serves for removing powders of the raw material, dusts and so on.

Case 67 is provided with waste outlet 67A for discharging wastes and paper filter 21 already used, drain tube guide 67B to lead drain tube 22D, and raw material chute guide 67C which guides raw material chute 110.

According to the constitution in the embodiment, the air in case 67 heated by heaters 68A and 68B is not discharged to the outside but only circulated in case 67 even if blower fan 71 is operated, thereby beverage extraction chamber 1 is kept hot enough. Accordingly, the extracted beverage is prevented from lowering of the temperature, thereby a beverage hot enough can be served. Because there is no need to provide cylinder 20 with any heating member which has to be detached therefrom for maintenance, facility in handling of cylinder 20 is improved.

If mixing bowl 115 is contained in case 67, an extracted beverage at higher temperature can be served. The steam generated in mixing bowl 115 may be exhaled by steam exhaust tube 67 B in case 67 connected with mixing bowl 115. A temperature sensor may be provided in case 67 to control the electric power supply to heaters 68A and 68B and blower fan 71 so that the temperature in case 67 may be kept constant.

As described in the foregoing, in a beverage serving apparatus according to the first feature of the invention, a plate radiating far-infrared rays is provided so as to surround the extraction means with a predetermined distance separating each other and the plate is heated by a heating means to radiate far-infrared rays which heat the extraction means, thereby an extracted beverage hot enough can be served.

Further, in a beverage serving apparatus according to the second and third features of the invention, means for exhaling steam are provided separately for the receiving means for receiving the raw material and hot water and for mixing means for mixing additives such as sugar, milk, etc., thereby serving of a hot extracted beverage is facilitated.

In addition, in a beverage serving apparatus according to the fourth feature of the invention, the extraction means for mixing the raw material with hot water and extracting a beverage from the mixture is surrounded by a member, such as a metal cylinder, the inside of which is heated by a heater, and a steam exhaling means is provided to have an inlet communicated with the receiving means and an outlet at a predetermined position inside the member surrounding the extraction means, thereby serving of a hot extracted beverage is facilitated.

Although the invention has been described with respect to the specific embodiments for complete and clear disclosure, the appended claims are not to be thus limited but are to be construed as embodying all modification and alternative constructions that may occur to one skilled in the art which fairly fall within the basic teaching herein set forth.

What is claimed is:

1. A beverage serving apparatus in which a hot beverage is prepared by extraction, comprising:
    extracting means for mixing a raw material for said hot beverage with hot water and extracting said hot beverage from said raw material mixed with said hot water;
    a plate for radiating far-infrared rays by being heated, facing said extracting means with a predetermined distance separating said radiating plate from said extracting means; and means for heating said radiating plate;
    wherein said extracting means comprises:
        a receiving chamber for receiving said raw material and said hot water;
        an extraction chamber communicating with said receiving chamber via a selectively open conduit, said extraction chamber being supplied with a mixture of said raw material mixed with said hot water from said receiving chamber, and compressed air to apply a pressure to said mixture; and
        a paper filter for covering an outlet of said extraction chamber, said hot beverage being extracted by filtration through said paper filter.

2. The beverage serving apparatus as defined in claim 1, wherein said radiating plate comprises an alumite-processed metal plate.

3. The beverage serving apparatus as defined in claim 1, wherein said radiating plate comprises a metal plate having a surface of black.

4. The beverage serving apparatus as defined in claim 1, wherein said radiating plate is a flat plate.

* * * * *